US012572417B2

(12) United States Patent
Galbi et al.

(10) Patent No.: US 12,572,417 B2
(45) Date of Patent: Mar. 10, 2026

(54) TRANSLATION CACHE AND CONFIGURABLE ECC MEMORY FOR REDUCING ECC MEMORY OVERHEAD

(71) Applicant: Intel Corporation, Santa Clara, CA (US)

(72) Inventors: Duane E. Galbi, Wayland, MA (US); Wim Heirman, Ghent (BE); Dimitrios Ziakas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 17/483,536

(22) Filed: Sep. 23, 2021

(65) Prior Publication Data

US 2022/0012126 A1 Jan. 13, 2022

(51) Int. Cl.
| *G06F 11/00* | (2006.01) |
| *G06F 11/10* | (2006.01) |
| *G06F 12/0875* | (2016.01) |
| *G06F 12/12* | (2016.01) |

(52) U.S. Cl.
CPC ...... *G06F 11/1068* (2013.01); *G06F 12/0875* (2013.01); *G06F 12/12* (2013.01); *G06F 2212/1016* (2013.01)

(58) Field of Classification Search
None
See application file for complete search history.

(56) References Cited

U.S. PATENT DOCUMENTS

| 6,591,343 B1 * | 7/2003 | Col | G06F 12/0846 |
| | | | 712/213 |
| 9,971,713 B2 * | 5/2018 | Asaad | G06F 12/0864 |
| 2011/0219208 A1 * | 9/2011 | Asaad | G06F 9/06 |
| | | | 712/12 |
| 2016/0011996 A1 * | 1/2016 | Asaad | G06F 9/3885 |
| | | | 710/308 |
| 2017/0091091 A1 * | 3/2017 | Bradbury | G06F 12/128 |
| 2017/0329674 A1 * | 11/2017 | Sreedhar M. | G06F 12/128 |
| 2018/0095875 A1 * | 4/2018 | Zhang | G06F 12/0864 |
| 2018/0107591 A1 * | 4/2018 | Smith | G06F 3/0613 |
| 2019/0235762 A1 * | 8/2019 | Kaburaki | G06F 12/0864 |
| 2021/0141692 A1 | 5/2021 | Agarwal et al. | |
| 2021/0191811 A1 | 6/2021 | Galbi et al. | |
| 2021/0326262 A1 * | 10/2021 | Hunt | G06F 11/3065 |
| 2021/0357324 A1 * | 11/2021 | Walker | G06F 12/12 |

* cited by examiner

*Primary Examiner* — Mujtaba M Chaudry
(74) *Attorney, Agent, or Firm* — Compass IP Law PC

(57) ABSTRACT

A translation cache and configurable error checking and correction ("ECC") memory reduces ECC memory overhead. The translation cache supports a configurable ECC memory capable of storing a portion of a cache line, along with any ECC data, in corresponding parts of memory devices to reduce the ECC memory overhead in a memory subsystem. The corresponding parts include any same one of an upper, lower, left or right part of memory devices in a memory module, including dynamic random access memory ("DRAM") devices in a dual inline memory module ("DIMM").

20 Claims, 13 Drawing Sheets

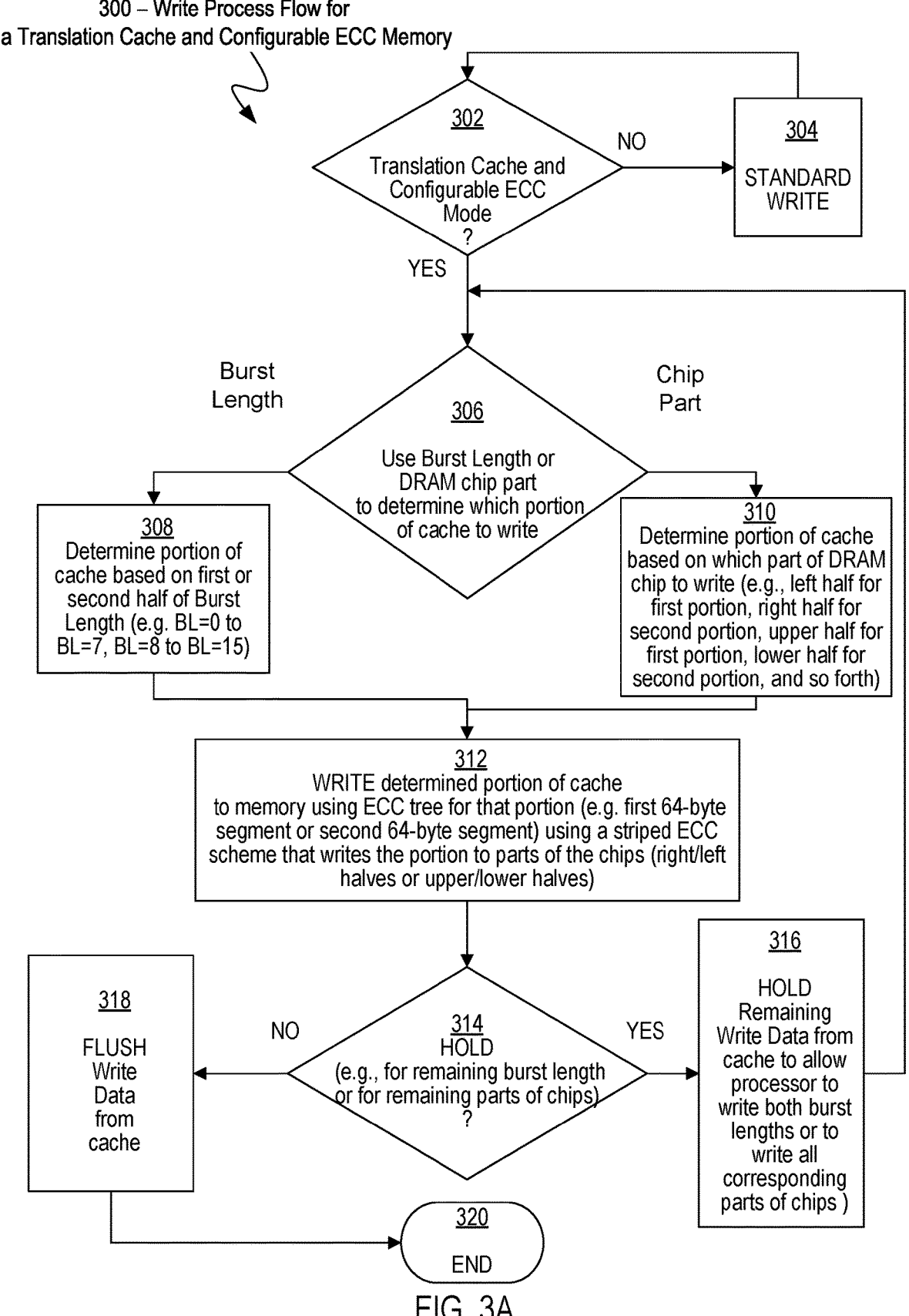

300 – Write Process Flow for
a Translation Cache and Configurable ECC Memory

302
Translation Cache and
Configurable ECC
Mode
?

NO

304
STANDARD
WRITE

YES

Burst
Length

Chip
Part

306
Use Burst Length or
DRAM chip part
to determine which portion
of cache to write 308
Determine portion of
cache based on first or
second half of Burst
Length (e.g. BL=0 to
BL=7, BL=8 to BL=15)

310
Determine portion of cache
based on which part of DRAM
chip to write (e.g., left half for
first portion, right half for
second portion, upper half for
first portion, lower half for
second portion, and so forth)

312
WRITE determined portion of cache
to memory using ECC tree for that portion (e.g. first 64-byte
segment or second 64-byte segment) using a striped ECC
scheme that writes the portion to parts of the chips (right/left
halves or upper/lower halves)

318
FLUSH
Write
Data
from
cache

NO

314
HOLD
(e.g., for remaining burst length
or for remaining parts of chips)
?

YES

316
HOLD
Remaining
Write Data from
cache to allow
processor to
write both burst
lengths or to
write all
corresponding
parts of chips )

320
END

FIG. 3A

330 – Read Process Flow for
a Translation Cache and Configurable ECC

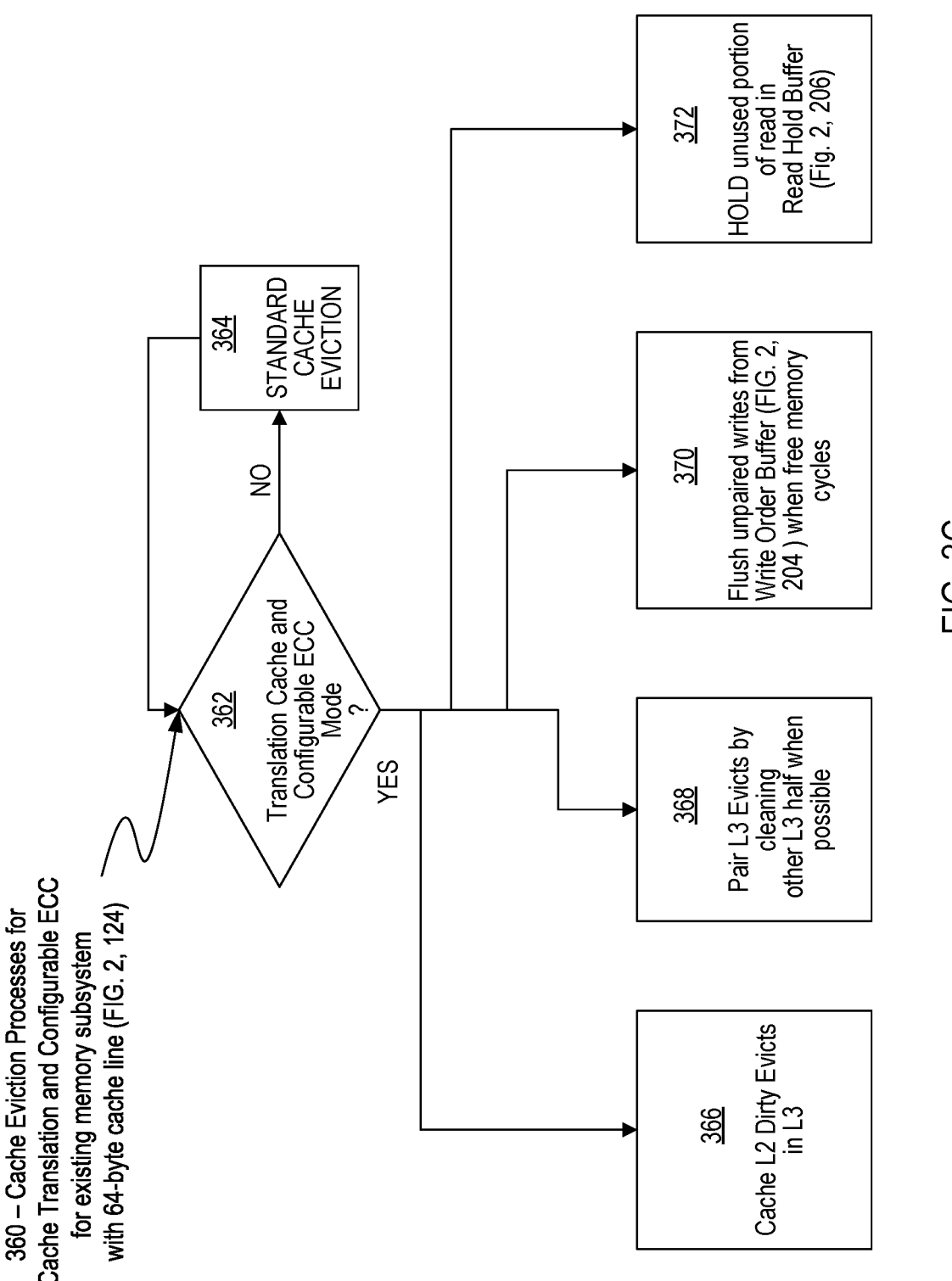

360 – Cache Eviction Processes for
Cache Translation and Configurable ECC
for existing memory subsystem
with 64-byte cache line (FIG. 2, 124)

362
Translation Cache and
Configurable ECC
Mode
?

NO

YES

364
STANDARD
CACHE
EVICTION

366
Cache L2 Dirty Evicts
in L3

368
Pair L3 Evicts by
cleaning
other L3 half when
possible

370
Flush unpaired writes from
Write Order Buffer (FIG. 2,
204 ) when free memory
cycles 372
HOLD unused portion
of read in
Read Hold Buffer
(Fig. 2, 206)

FIG. 3C

Standard 2x(10 x4) (64B) – Width 20 x4@BL=16, 25% overhead (4 x4 ECC per 16 x4)

400

404

Failure Domain (full SDDC)

402a

402b

Overhead (e.g., ECC Trees)

Overhead (e.g., ECC Trees)

40-bit (64-byte) Sub-Channel 0

40-bit (64-byte) Sub-Channel 1

TRANSLATION CACHE AND CONFIGURABLE ECC MEMORY FOR REDUCING ECC MEMORY OVERHEAD

FIELD

Descriptions are generally related to memory devices, and more particularly related to reducing memory overhead for error checking and correction ("ECC") data.

BACKGROUND

The error handling expectations in a modern memory subsystem include expectations for reliability, availability, serviceability, or RAS. RAS expectations often include an expectation for a full SDDC (single device data correction) capability built into the memory subsystem. Full SDDC capability enables data correction in the event of a full device failure. To enable full SDDC, dynamic random access memory ("DRAM") devices in a modern memory subsystem store bits of ECC data, including ECC trees, in DRAM devices along with the actual data. The ECC data stored in DRAM devices is generally referred to as ECC memory overhead, ECC DRAM or ECC chips. For example, x4 DRAM devices provide four bytes ("4B") of data per device using a 4-bit wide data interface and x8 DRAM devices provide eight bytes ("8B") of data per device.

Processor cores typically operate with fixed-size cache lines, such as the 64 byte ("64B") cache line size of processor cores manufactured by Intel Corporation, the assignee of the present application. The processor's DRAM memory subsystem typically operates on a matching 64B cache line size and includes the ECC data to enable SDDC for the memory subsystem. For a memory subsystem built with x4 DRAMs that have a burst length of 16, such as DRAMS that operate in accordance with the double data rate, version 5 ("DDR5") standard published by the Joint Electron Device Engineering Council ("JEDEC") standards organization at www.jedec.org, the memory interface requires eight (8) DRAMs for the 64B cache data and an extra two (2) DRAMs to supply the SDDC ECC data used to error check and correct the data. As a result, an extra 25% of DRAMs, two (2) per eight (8) DRAMS, are required to enable SDDC.

Future generations of memory devices are expected to have a much smaller ratio of data signal lines per device to the total number of bits per read operation, referred to as shrinking channels, as more data is provided from fewer devices. Additionally, ECC bits allocated to ECC data in a DRAM are sometimes repurposed for poisoning, directories, security, or other applications. It is unlikely that future generations of memory devices will have enough ECC bits available in the ECC memory overhead to provide full SDDC capability.

BRIEF DESCRIPTION OF THE DRAWINGS

The following description includes discussion of figures having illustrations given by way of example of an imple-mentation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessar-ily mutually exclusive.

FIG. 3A is a flow diagram of an example of a write process for a translation cache and configurable ECC memory to reduce ECC memory overhead in accordance with the described embodiments.

FIG. 3C is a functional block diagram of example cache eviction processes for a translation cache and configurable ECC memory to reduce ECC memory overhead in accor-dance with the described embodiments.

Figure 1:
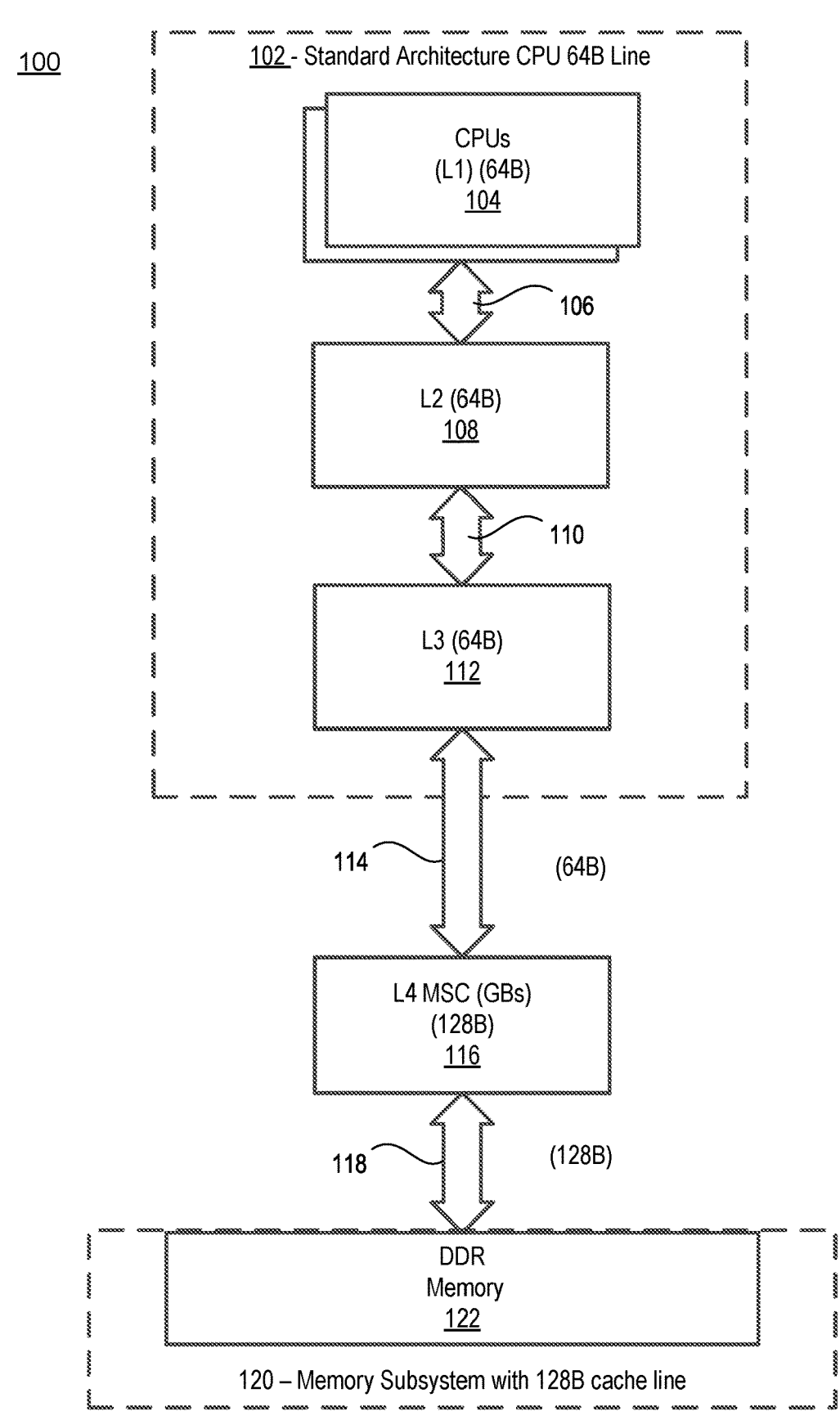
FIG. 1 is a block diagram of an example of a processor complex connected to a memory subsystem in which a translation cache and configurable ECC memory to reduce ECC memory overhead can be implemented in accordance with the described embodiments.

Descriptions of certain details and implementations fol-low, including non-limiting descriptions of the figures, which may depict some or all examples, and well as other potential implementations.

DETAILED DESCRIPTION

In the description that follows, ECC memory refers to the DRAM devices that are used to store ECC data, including ECC data comprising an ECC tree. For example, an ECC tree can refer to ECC data for one 64B segment of a 128B cache line. The ECC tree is used to perform error correction coding analysis on the data in a segment of a cache line. For a standard memory interface requiring eight (8) DRAMs for a 64B cache data and an extra two (2) DRAMs (i.e., a DRAM pair) to supply the ECC memory bits to enable SDDC, the ECC tree is stored in the extra two (2) DRAMs. One ECC tree for the first 64B segment is stored in one extra DRAM pair and a second ECC tree for the second 64B segment is stored in a second extra DRAM pair. In a memory subsystem built with twenty (20) x4 DDR5 DRAMs that have a burst length of 16, the ECC memory overhead is 25% of the overall memory cost (see, for example, FIG. 4A). Increasing a processor core's internal processor cache line size, such as doubling the size from 64B to 128B, could reduce by half the number of ECC memory bits to enable SDDC. However, such a transition to a larger cache line size would require an extensive change to the processor core. To overcome the challenge of reducing ECC memory overhead without requiring changes to the processor core, embodiments of a translation cache and configurable ECC memory are provided as described herein.

In one embodiment, a configurable ECC memory is provided to reduce the number of DRAMs needed to store the ECC trees. The configurable ECC memory is memory that includes a ECC DRAM that is capable of being configured to store two different ECC trees in accordance with a striped ECC storage scheme. A striped ECC storage scheme refers to storing one ECC tree for one segment of a cache line in one part of the ECC DRAMs and a second ECC tree for a second segment of the cache line in a second part of the same ECC DRAMs. Likewise, the two segments of the cache line are stored in respective parts of the data DRAMs. In this manner, both ECC trees for two segments of a cache line can be contained in the same ECC memory overhead as for a non-striped unsegmented cache line. While requiring no additional ECC overhead bits, the striped ECC storage scheme still allows each segment of a cache line to be written directly without requiring any changes to the other segment of the cache line.

Using the above-described example of a 128B cache line comprising two 64B segments, instead of requiring eight (8) DRAMs to store the cache data and an extra DRAM pair for each of the 64B segments to store the respective ECC trees, the 64B segments could instead share a single DRAM pair in accordance with embodiments of a translation cache and configurable ECC memory as described herein. In a memory subsystem built with eighteen (18) x4 DDR5 DRAMs that have a burst length of 16, the ECC memory overhead is reduced, saving 12.5% of the overall memory cost (see, for example, FIG. 4B). Similar improvements can be obtained for processor cores and memory subsystems that use other cache line sizes and their multiples.

In one embodiment, to achieve the reduction in ECC memory overhead, a translation cache is placed between processor(s) with 64B cache line size(s) and a DRAM memory subsystem with a 128B cache line size, referred to hereinafter as a 128B DRAM memory subsystem (see, for example, FIG. 1). Alternatively, in one embodiment, the translation cache includes data queues placed between processor(s) with 64B cache line size(s) and a 128B DRAM interface to the rest of the memory subsystem (see, for example, FIG. 2). Such an arrangement allows existing systems with standard 64B cache line sizes to operate with a 128B DRAM interface.

Regardless of whether the translation cache is placed between the processor and a 128B DRAM memory subsystem or between the processor and the 128B DRAM interface, embodiments of the translation cache and configurable ECC memory configure the DRAMs using the described striped ECC storage scheme.

In addition, embodiments of the translation cache and configurable ECC memory can be configured to operate in either pure standard mode, e.g. a pure 64B mode, or a newer mode, e.g., the double-width 128B mode. This accommodation makes it possible to build both a standard 64B and newer 128B cache line size systems with the same silicon part. While the description that follows uses examples of 64B and 128B cache line sizes, embodiments of the translation cache and configurable ECC memory can be implemented to accommodate different cache line sizes of other processors manufactured by other vendors as well as different memory cache line sizes. In addition, the memory cache line size can be extended to any multiple of the internal processor cache line size in accordance with embodiments of a translation cache and configurable ECC memory as described herein.

Embodiments of a translation cache and configurable ECC memory can be applied to all different memory device widths (x4, x8, etc.), different DRAM burst lengths (DDR4=8, DDR5=16, etc.), and other schemes which limit the fault radius of DRAM, i.e., where the internal organization is such that faults tend to be localized within certain sub-groups of the input/output (I/O).

Embodiments of a translation cache and configurable ECC memory are also compatible with other schemes to reduce the ECC memory overhead, such as bounded chip failure ("BF") in which each half of a memory device operate as independent failure domains. In all cases, embodiments of a translation cache and configurable ECC memory are capable of reducing the ECC memory overhead by up to half of the ECC memory that would otherwise be required to enable error checking and correction of data, including full SDDC capability.

In one embodiment, in order to allow additional space in the cache line for meta-bits, the number of ECC bits used can also be increased above the minimum required for full SDDC capability without conflicting with the reduction of ECC memory overhead provided by embodiments of a translation cache and configurable ECC memory.

FIG. 1 is a block diagram of an example of a system 100 in which a translation cache and configurable ECC memory to reduce ECC memory overhead can be implemented in accordance with the described embodiments.

As illustrated, system 100 includes a processor complex 102 with an internal 64-byte ("64B") cache line connected to a memory subsystem 120 with a 128-byte ("128B") cache line. The processor complex 102 includes one or more processors, including a single core processor or a multi-core processor. The processor can be a central processing unit ("CPU") 104, or any other type of processor, microprocessor, graphics processing unit (GPU), or other controller or processor that executes instructions that result in requests for access to memory. Each processor includes a 64B level 1 ("L1") internal processor cache.

In one embodiment, the processor complex 102 includes additional internal processor caches, including shared caches. For example, the L1 caches can be connected via internal buses 106 and 110 to a level 2 ("L2") 64B cache 108 and a level three ("L3") 64B cache 112. In one embodiment, a full 128B cache line memory side oriented cache ("MSC") 116, external to the processor complex 102, can be positioned between the 64B internal processor caches L1, L2 and L3, and the 128B memory sub-system 120 via a 128B bus 118.

In one embodiment, the MSC cache 116 is defined as a new cache in the cache hierarchy, e.g., a level four ("L4") cache, that functions as a unified cache to unify two 64B cache sub-lines into one 128B cache line. In one embodiment, the MSC 116 could instead be a redefinition of the last level cache in the existing cache hierarchy, e.g., L3. For example, with reference to the illustrated system in FIG. 1, the L3 cache 112 would instead be redefined as a 128B L3 MSC separate from the processor complex 102.

In one embodiment, whether considered an L4 cache or a redefinition of a last level internal processor L3 cache, the MSC cache 116 is configured to retain 128B read data (from memory subsystem 120) long enough to allow a CPU 104 in the processor complex 102 adequate time to potentially use the full read data despite operating with an internal 64B cache line size. The MSC cache 116 can also be configured to retain 64B write data long enough to allow a CPU 104 in the processor complex 102 adequate time to potentially write both 64B segments of a 128B cache line to the memory subsystem 120.

In one embodiment, the memory subsystem 120 includes a double data rate ("DDR") memory 122. For example the memory subsystem 120 can include DDR5 memory devices arranged in a dual inline memory module (DIMM) operating in accordance with DDR5 JEDEC standards. The memory subsystem 120 can include circuitry to manage access to the memory 122. In one embodiment, the circuitry to manage access to the memory 122 includes a memory controller (not shown) as part of a processor die (integrated memory controller or on-die controller). In one example, the memory subsystem 120 includes a memory controller in circuitry integrated onto a system on a chip (SoC) that includes a processor. Such an SoC could also include peripheral controllers, communication controllers, graphics controllers, or other circuitry (not shown).

Figure 2:
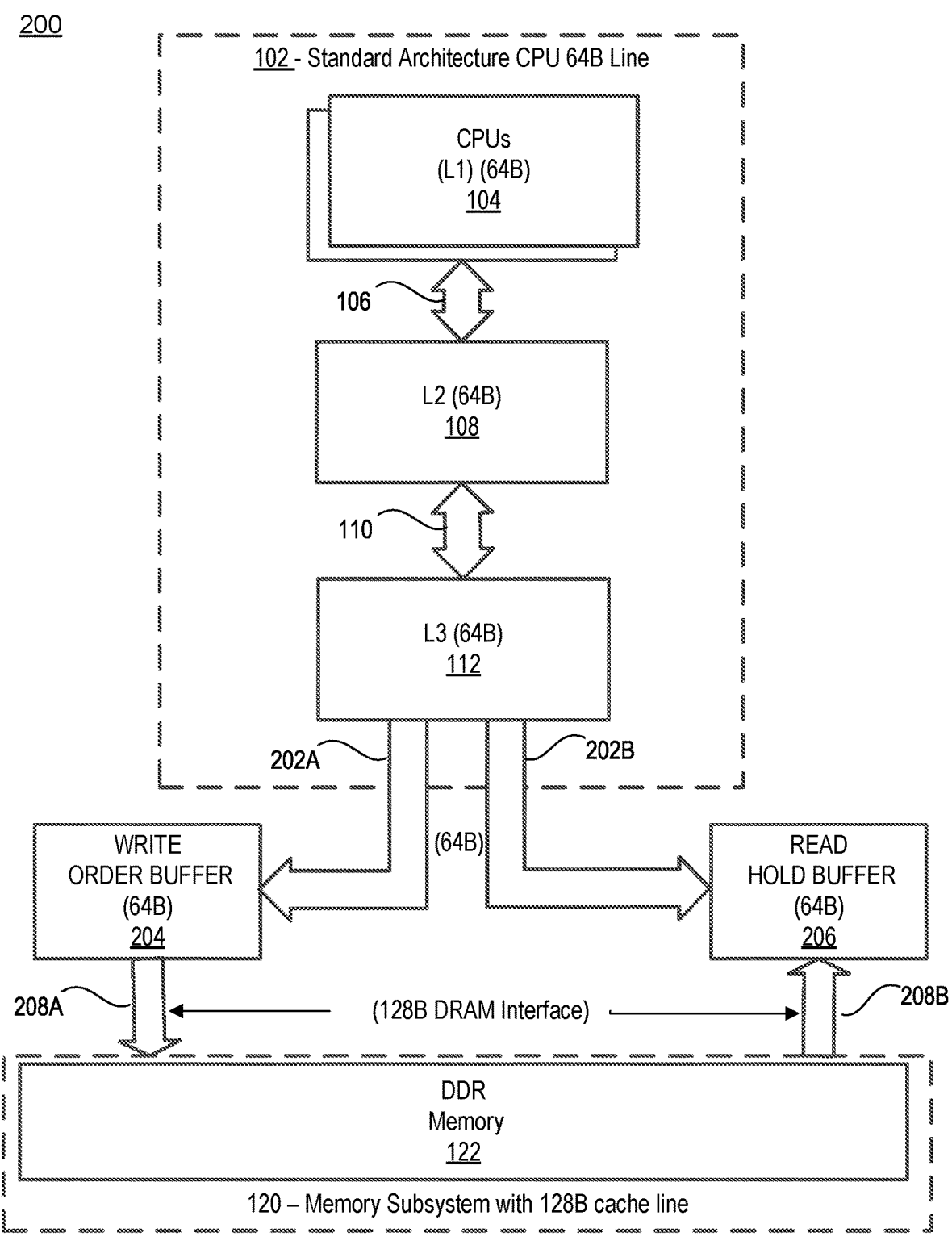
FIG. 2 is a block diagram of an example of processor complex connected to a memory subsystem having a DRAM interface in which a translation cache and configurable ECC memory to reduce ECC memory overhead can be imple-mented in accordance with the described embodiments.

FIG. 2 is a block diagram of an example of another system 200 in which a translation cache and configurable ECC memory to reduce ECC memory overhead can be implemented in accordance with the described embodiments. In system 200, the processor complex 102 is configured to interoperate with memory subsystem 120 via a 128B DRAM interface as described herein.

As in system 100 of FIG. 1, system 200 of FIG. 2 includes a processor complex 102 with an internal 64B cache line. FIG. 2 illustrates at least some of the changes to the processor complex 102 to allow connection to the memory subsystem 120 via a 128B DRAM interface 208A/208B in accordance with embodiments of a translation cache and configurable ECC memory for reducing ECC memory overhead. For example, instead of having a full cache to buffer the 128B cache line, the system 200 includes a smaller read buffer and write buffer.

As in FIG. 1, the processor complex 102 illustrated in FIG. 2 includes one or more CPUs 104 (or other type of processor), each with a 64B level 1 ("L1") internal processor cache. In one embodiment, the processor complex 102 includes additional internal processor caches, including shared caches. For example, the L1 caches can be connected via internal buses 106 and 110 to an L2 64B cache 108 and an L3 64B cache 112.

In one embodiment, instead of having a full 128B MSC cache 116 to buffer the 128B cache line (as illustrated in FIG. 1), the processor complex 102 connects respectively, via 64B buses 202A/202B, to a 64B write order buffer 204 and 64B read hold buffer 206, each of which connect to a memory subsystem 120 via a 128B DRAM interface 208A/208B. The write order buffer 204 holds one-half of 128B cache line writes in order to allow the processor complex 102 with standard architecture 64B line size CPUs to write each half of the 128B cache line to the memory subsystem 120 via the 128B DRAM interface 208A. Likewise, the read hold buffer 206 holds the unused half of the 128B read cache line to allow the processor complex 102 sufficient time to use both segments of the cache line read from the memory subsystem 120 via the 128B DRAM interface 208B.

In the illustrated embodiment of FIG. 2, the processor complex 102 last level cache, i.e., the 64B L3 cache 112, is modified to facilitate automatically flushing the two 64B cache lines that make up the 128B cache line written or read via the 128B DRAM interface 208A/208B. In one embodiment, the 64B L3 cache 112 is flushed to the write order buffer 204. For example, when one of the 64B cache lines present in the 64B L3 cache 112 is dirty (i.e., has been modified by a write operation but not yet saved to memory) and is being flushed, the other 64B half of the 128B cache line, if also present in the 64B L3 cache 112, is flushed to the write order buffer 204 as well, but not removed from the cache. In other words, only the 64B cache line that caused the flush operation to be triggered is removed from the L3 64B cache 112, whereas the other 64B half of the 128B cache line remains in the cache until it, too, needs to be removed to make room for new cache data.

In one embodiment, the memory subsystem 120 includes a double data rate ("DDR") memory 122. For example the memory subsystem 120 can include DDR5 memory devices arranged in a dual inline memory module (DIMM) operating in accordance with DDR5 JEDEC standards. The memory subsystem 120 can include circuitry to manage access to the memory 122. In one embodiment, the circuitry to manage access to the memory 122 includes a memory controller (not shown) as part of a processor die (integrated memory controller or on-die controller). In one example, the memory subsystem 120 includes a memory controller in circuitry integrated onto a system on a chip (SoC) that includes a processor. Such an SoC could also include peripheral controllers, communication controllers, graphics controllers, or other circuitry (not shown).

Figure 3B:
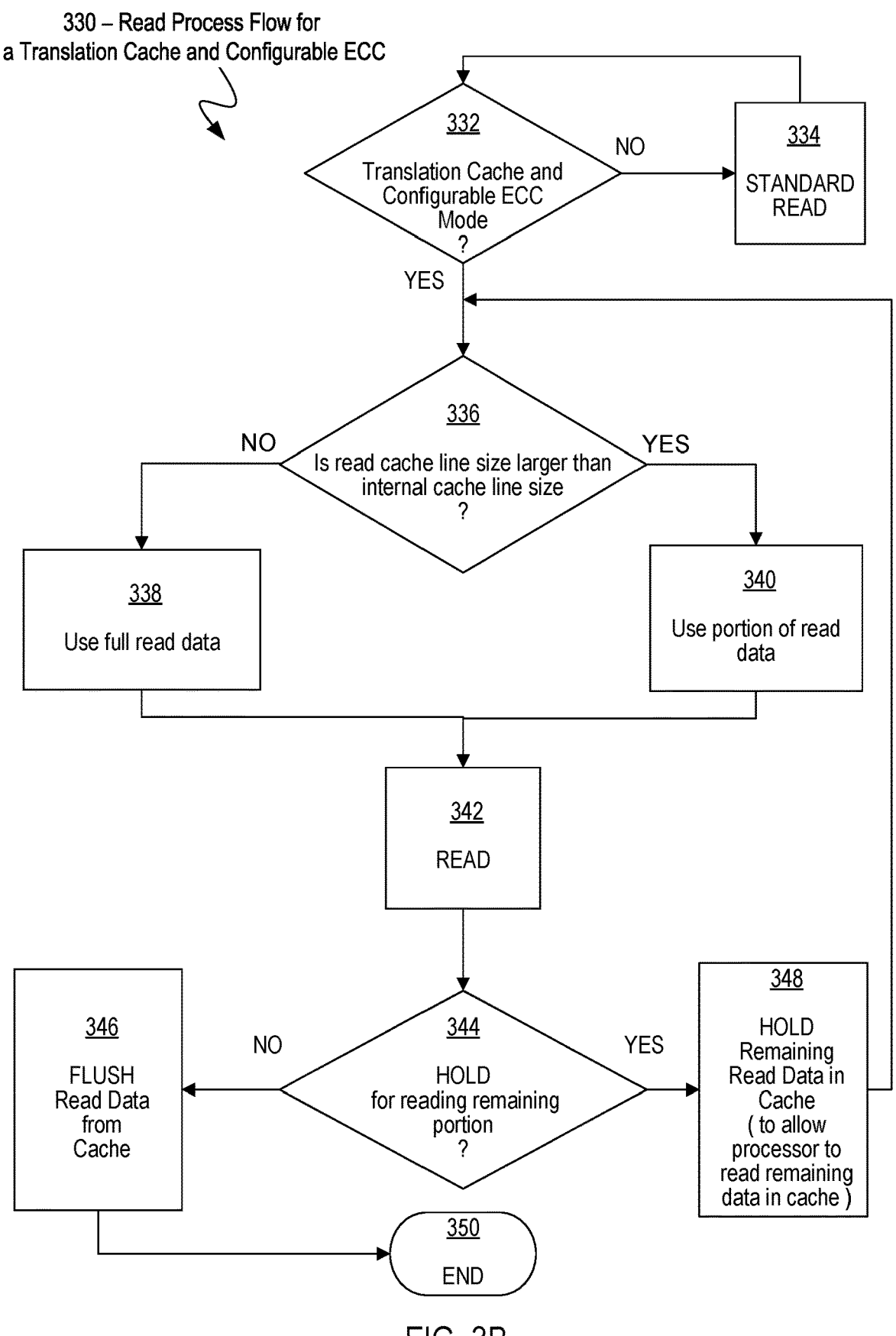
FIG. 3B is a flow diagram of an example of a read process for a translation cache and configurable ECC memory to reduce ECC memory overhead in accordance with the described embodiments.

FIGS. 3A-3B are flow diagrams of example processes performed to implement a translation cache and configurable ECC memory to reduce ECC memory overhead in accordance with the described embodiments.

In one embodiment, using a cache having a 128B cache line, read operations on the DRAM chips are always performed in 128B data chunks. For an Intel processor having an instruction architecture ("IA") cache line size of 64B, the 128B read is twice the width of the processor's internal cache line. In one embodiment, write operations can write a full 128B cache line or can write either of the 64B cache sub-lines (also referred to as segments). When writing a 64B cache sub-line, a half-burst length write is used. The write can either begin at the start of the original 128B cache line to write half the burst, or can begin on the second half of the original 128B cache line to write the remaining half burst. In this manner, only the first 64B or the second 64B cache sub-lines are written. Writing the two 64B cache sub-lines in this manner occupies substantially the same amount of time on a DRAM bus as writing a full 128B cache line. However, it advantageously allows each 64B cache sub-line to be written without perturbing the other 64B cache sub-line contained in the full 128B cache line. The aforementioned ECC data comprising separate ECC trees for each 64B cache sub-line allows each of the 64B cache sub-lines to be written independently of one another.

FIG. 3A is an example of a write process 300 for a translation cache and configurable ECC memory to reduce ECC memory overhead in accordance with the described embodiments. The write process 300 begins at decision block 302 to determine whether a translation cache and configurable ECC memory mode has been enabled. For example, the translation cache and configurable ECC memory mode can be enabled when the memory subsystem includes memory in which a mode register has been enabled (e.g., as determined by a register in the memory module containing the memory). If enabled, a processor complex having a different cache line size than the memory subsystem, such as a processor with a 64B cache line size and a memory subsystem with a 128B cache line size, can operate in what is referred to herein as a 128B mode. This allows embodiments of a translation cache to configure the memory devices to reduce ECC memory overhead in accordance with the described embodiments. If not enabled, then at block 304, the process 300 continues to perform a standard write, i.e., when the memory does not contain configurable ECC memory and the processor complex and the memory both use a 64-byte cache line size, sometimes referred to as a pure 64B mode.

If operating in 128B mode, the write process 300 continues at decision block 306 to determine which portion of the cache line to write and how the cache data is to be stored on the chip. In a typical embodiment, the portion of the cache line is determined using the burst length and the determined portion is stored in parts of the chips, such as to the upper halves or lower halves of the chips. In one embodiment, the portion of the cache line is instead determined based on how the cache data is to be stored in the chips, i.e., the DRAM chip part. For example, the portion of the cache line can be determined based on whether it is to be stored in (or retrieved from) the left halves of the DRAM chips, or whether it is to be stored in (or retrieved from) the right halves of the DRAM chips.

Irrespective of how the portion of the cache line is determined, in one embodiment, storing the determined portion of the cache in corresponding DRAM chip parts can be referred to as "a striped ECC storage scheme" since it is based on storing data, including ECC data, to parts of the chips in a striped or alternating pattern. For example, embodiments of striped or alternating patterns can appear vertical or horizontal relative to the chip layout in the memory module, where the chip layout includes chips for storing cache data and one or more chips dedicated to storing ECC data.

In some embodiments, other patterned ECC storage schemes can be employed as long as corresponding parts of the DRAM chips are used to store (and retrieve) the determined portion of the cache. For example, the patterned ECC storage scheme can include storing a portion of a cache line to all upper left quarters of the DRAM chips, all lower right quarters of the DRAM chips, and so forth. The locations and number corresponding parts in a DRAM device can vary based on how many portions of the cache line are distributed over the corresponding parts of the DRAM chips and/or whether the DRAM chips support other features, such as bounded failure ("BF") in which one or more parts of the DRAM devices operates as an independent failure domain.

Referring again to FIG. 3A, in one embodiment, if using the burst length, then the write process 300 continues at block 308 to determine which portion of the cache line to write, e.g., whether to write the cache line represented in the first half or the second half of the burst length. For example, when writing to DRAM composed of x4 DRAM chips capable of storing a DRAM 128B cache line burst length of 16 data words, a first half of the cache line could correspond to a DDR5 burst data words 0 thru 7, and a second half of the cache line could correspond to DDR5 burst data words 8 through 15. Other combinations are possible.

In one embodiment, if using the DRAM chip part to decide, then the write process 300 continues at block 310 to determine the portion of the cache line to write based on which corresponding parts of the DRAM chips are to be written. For example, when writing to DRAM composed of x4 DRAM chips capable of storing a DRAM 128B cache line burst length of 16 data words, a first portion of the cache line (or first segment) could be stored in corresponding parts of the chips that are all located on the left side of the chips, and a second portion of the cache line (or second segment) could be stored in corresponding parts of the chips that are all located on the right side of the chips. Other combinations are possible.

In one embodiment, the write process 300 continues at block 312 to issue a WRITE command to write the determined portion of the cache line (or segment) to memory. In one embodiment, the ECC data for the determined portion of cache, such as the ECC tree, is written along with the determined portion of cache to corresponding parts of the DRAM memory chips using the striped ECC storage scheme.

In one embodiment, for example, the determined portion of the cache line and the ECC data can be written to only an upper or lower half of the DRAM memory chips. The remaining portion of the cache line (and the respective ECC data) can be written to an opposite half of the DRAM memory chips in accordance with the striped ECC storage scheme. For example, if the determined portion of the cache line and the ECC data was written to an upper half of the DRAM memory chips, then the remaining portion of the cache line can be written to the lower half of the DRAM memory chips. Likewise, if the determined portion of the cache line and the ECC data was written to a left half of the DRAM memory chips, then the remaining portion of the cache line can be written to the right half of the DRAM memory chips. Other combinations are possible (such as if there are more than two portions of a cache line to be stored on corresponding parts of the DRAM memory chips).

In one embodiment, the write process 300 continues at decision block 314 to determine whether to hold the write data at process block 316, i.e., whether to hold in the cache the determined portion of the cache line that was written to memory. The write data is held in cache at process block 316 to allow the processor enough time to write all of the 128B cache line. For example, the write process 300 can hold the remaining write data in cache at process block 316 to allow the processor to write both portions of cache data for the first and second burst lengths to the corresponding parts of the DRAM memory chips, such as the upper chip halves or lower chip halves. As another example, the write process 300 can hold the remaining write data in cache at process block 316 to write all portions of data representing all corresponding parts of the DRAM memory chips if the determined portion of the cache line was decided based on which corresponding parts of the DRAM memory chips are to be written (e.g., all right halves, all left halves, all upper right quarters, all lower left quarters, etc.). Upon completing the hold at process block 316, the write process 300 loops back to continue processing any remaining portion of the cache line at decision block 306.

In one embodiment, the write process 300 can determine that it is not necessary to hold the write data. For example, when all of the write data in cache is written to memory, then there may be no further need to hold the write data. In this case, the write process 300 proceeds to FLUSH the write data from the cache at process block 318, and terminates the write process 300 at termination block 320.

FIG. 3B is an example of a read process 330 for a translation cache and configurable ECC memory to reduce ECC memory overhead in accordance with the described embodiments. Similar to the write process 300, the read process 330 begins at decision block 332 to determine whether a translation cache and configurable ECC memory mode has been enabled. For example, the translation cache and configurable ECC memory mode can be enabled when the memory subsystem includes memory in which a configurable ECC memory mode register has been enabled (e.g., as determined by a register in the memory module containing the memory). If enabled, a processor complex having a different cache line size than the memory subsystem, such as a processor with a 64B cache line size and a memory subsystem with a 128B cache line size, can operate in what is referred to herein as a 128B mode. This allows the translation cache to configure the memory to reduce ECC memory overhead in accordance with the described embodiments. If not enabled, then at block 334, the read process 330 continues to perform a standard read, i.e., when the memory does not contain configurable ECC memory and the processor complex and the memory both use a 64-byte cache line size, sometimes referred to as a pure 64B mode.

If operating in 128B mode, the read process 330 continues at decision block 336 to determine whether the read cache line size is larger than the internal cache line size of the processor. If so, then the read process 330 continues at process block 340 to prepare to use a portion of the read data, e.g., the first portion or the second portion of a 128B cache line read data. If not, then the read process 330 continues at process block 338 to prepare to use all of the available read data, referred to as the full read data.

In one embodiment, the read process 330 continues at block 312 to issue a READ command to read the determined portion of the 128B cache line read data or the full read data as appropriate. The determined portion of the 128B cache line read data can include portions that were determined based on burst length size (e.g., first or second half of a burst length) and portions that were determined based on the corresponding DRAM chip parts in which they were stored (e.g., upper or lower parts of a DRAM memory chip). At decision block 344, the read process 330 continues to determine whether to hold the data that was read in cache to allow any unused portion of data to be used by the processor. If so, the read process 330 continues at process block 348 to hold the remaining read data in cache, and returns control to decision block 336 so that the unused remaining portion of read data can be processed. If not, then the read process 330 continues to flush the read data from cache since the processor has used all of the read data. The read process terminates at termination block 350.

FIG. 3C is a functional block diagram of a cache eviction process 360 for a translation cache and configurable ECC memory to reduce ECC memory overhead in accordance with the described embodiments. As previously described, some embodiments of a translation cache and configurable ECC memory can be implemented in a processor complex interfacing with an existing memory subsystem 120 via a 128B DRAM interface. In one embodiment, the 128B DRAM interface is coupled to write and read hold buffers allow an existing last level cache of the processor (e.g., L3 cache 112 of FIG. 2) to function as a translation cache between the processor's 64B internal cache line and the 128B DRAM interface (as described with reference to FIG. 2). The cache eviction process 360 ensures that the internal processor caches, including the L2 cache 108 and L3 cache 112 (FIG. 2) properly manage each half of the 128B cached data.

Similar to the write and read processes 300, 330, the cache eviction processes 360 include a decision block 362 to determine whether a translation cache and configurable ECC memory mode has been enabled. If not enabled, then at block 334, the cache eviction process 364 continues to perform a standard cache eviction process.

If enabled, the cache eviction processes 360 includes one or more processes as described in process blocks 366, 368, 370 and 372. Process block 366 represents a process to cache any L2 cached data that is flagged as a dirty evict to the last level, or L3 cache. Process block 368 represents a process to pair L3 cached data that is flagged for eviction by cleaning the other half of the L3 cached data whenever possible (as described in detail with reference to FIG. 2). Process block 370 represents a process to flush unpaired writes from the write order buffer (204, FIG. 2) when free memory cycles allow. Process block 372 represents a process to hold any unused portion of a read in the read hold buffer (206, FIG. 2) to allow the processor adequate time to use all portions of read data read via the 128B DRAM interface (208A/208B, FIG. 2).

Figure 4A:
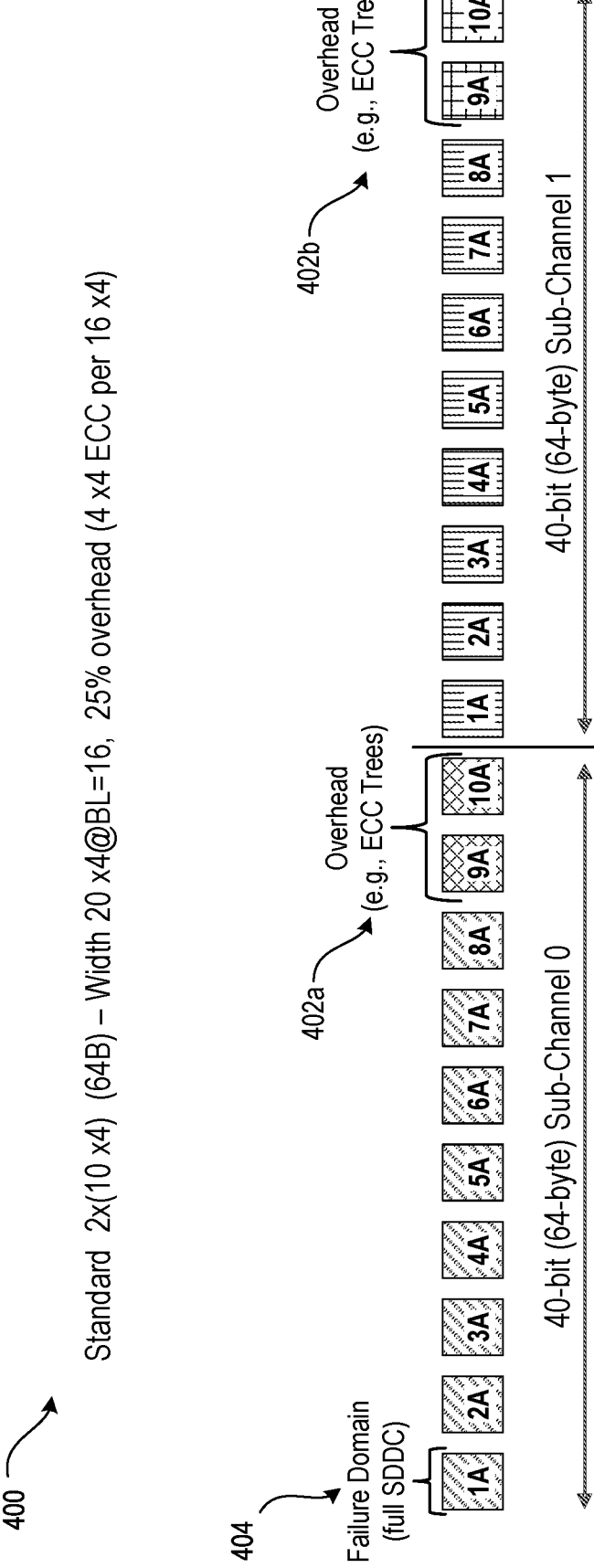
FIG. 4A is a block diagram of an example x4 DRAM memory module without reduced ECC memory overhead.
Figure 4B:
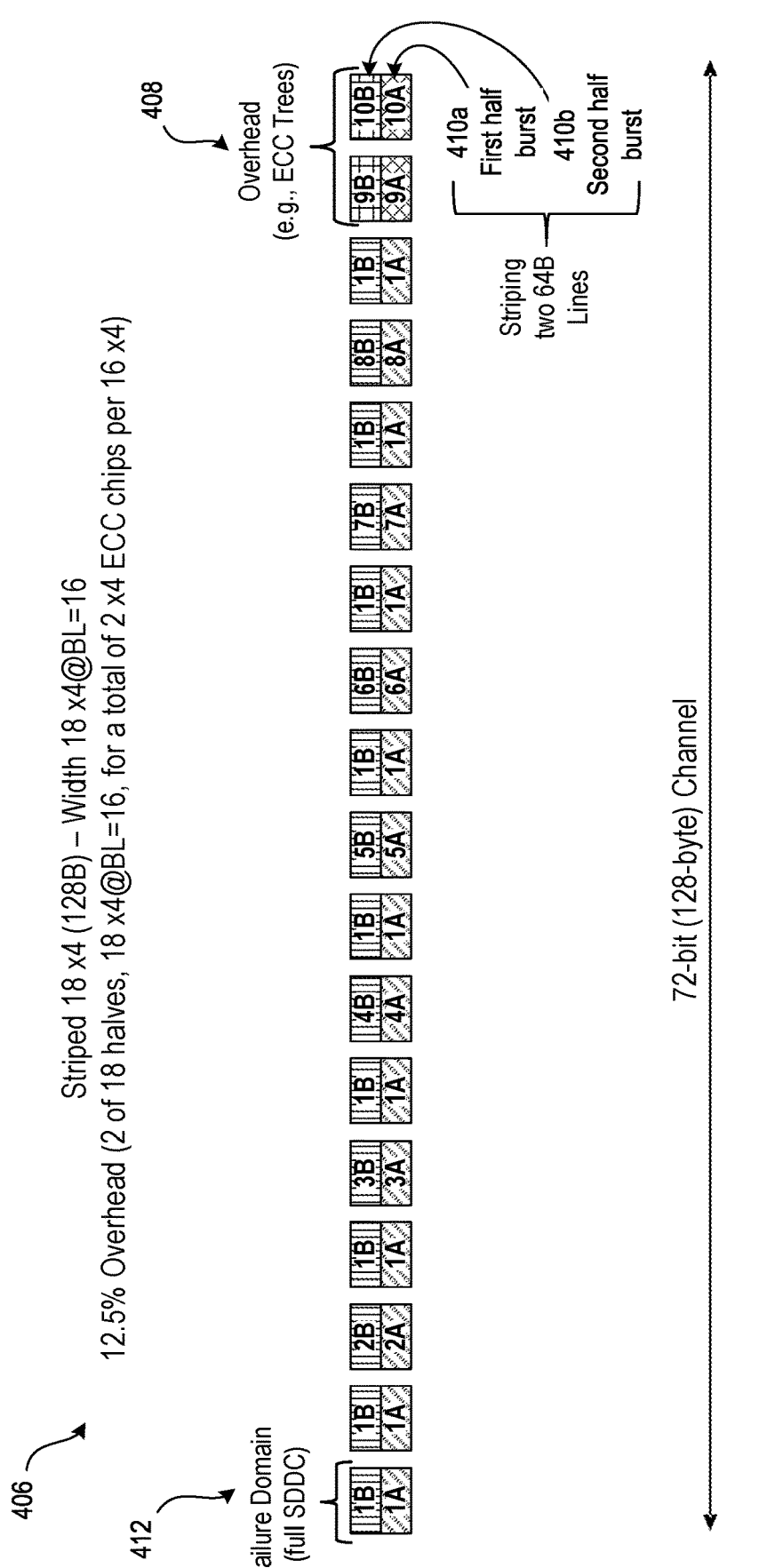
FIG. 4B is a block diagram of an example x4 DRAM memory module with reduced ECC memory overhead in accordance with the described embodiments of a translation cache and configurable ECC.

FIGS. 4A and 4B are block diagrams of an example x4 DRAM memory module. FIG. 4A depicts a conventional memory module 400 without reduced ECC memory overhead. Memory module 400 is a standard width 2×(10 x4) (64B) memory module comprising ten (10) x4 chips in 40-bit (64-byte) Sub-Channel 0 and ten (10) x4 chips in 40-bit (64-byte) Sub-Channel 1. A total of four (4) x4 chips 402a/402b across the sub-channels are dedicated to ECC memory overhead, e.g., the ECC trees, as compared to 16 x4 chips dedicated to data. The illustrated memory module 400 is full SDDC compliant with a failure domain 404 of one x4 chip. Such a conventional arrangement of x4 chips in memory module 400 results in an ECC memory overhead of 25% (4 x4 ECC chips per 16 x4 chips)

FIG. 4B depicts a memory module 406 configured in accordance with embodiments of a translation cache and configurable ECC memory as described herein. As illustrated, memory module 406, width 18 x4 (128B), comprises eighteen (18) x4 chips in a single 72-bit (128B) channel configured using a striped ECC storage scheme. Just two of the x4 chips 408 are dedicated to ECC memory overhead, e.g., the ECC trees, as compared to 16 x4 chips for data. As a result of striping the two 64B cache sub-lines that comprise the full 128B cache line across 18 halves, for a total of 18 x4 chips at a burst length=16, the ECC memory overhead is reduced to only 12.5% (2 x4 ECC chips per 16 x4 chips).

For example, the first half of the burst length 410a results in a first cache sub-line that can be stored in the lower half of the x4 chips, with the ECC trees for the first cache sub-line stored in the lower half of the two x4 chips dedicated to ECC memory 408, where the lower half is illustrated as 1A, 2A, . . . 9A in FIG. 4B. The second half of the burst length 410b results in a second cache sub-line that can be stored in the upper half of the x4 chips, with the ECC trees for the second cache sub-line stored in the upper half of the two x4 chips dedicated to ECC memory 408, where the upper half is illustrated as 1B, 2B, . . . 9B in FIG. 4B.

In one embodiment, the illustrated memory module 406 configured in accordance with a translation cache and configurable ECC memory remains full SDDC compliant with a failure domain 412 of one x4 chip, with a lower half corresponding to the first cache sub-line and the upper half corresponding to the second cache sub-line.

It should be noted that although the embodiment of memory module 406 is primarily described with reference to cache sub-lines that can be defined by the first or second half of a burst length, a similar arrangement and reduction in ECC memory overhead can be implemented when the cache sub-lines are determined in other ways, such as on the basis of DRAM chip parts in which the cache sub-line data and ECC data was stored.

Figure 5A:
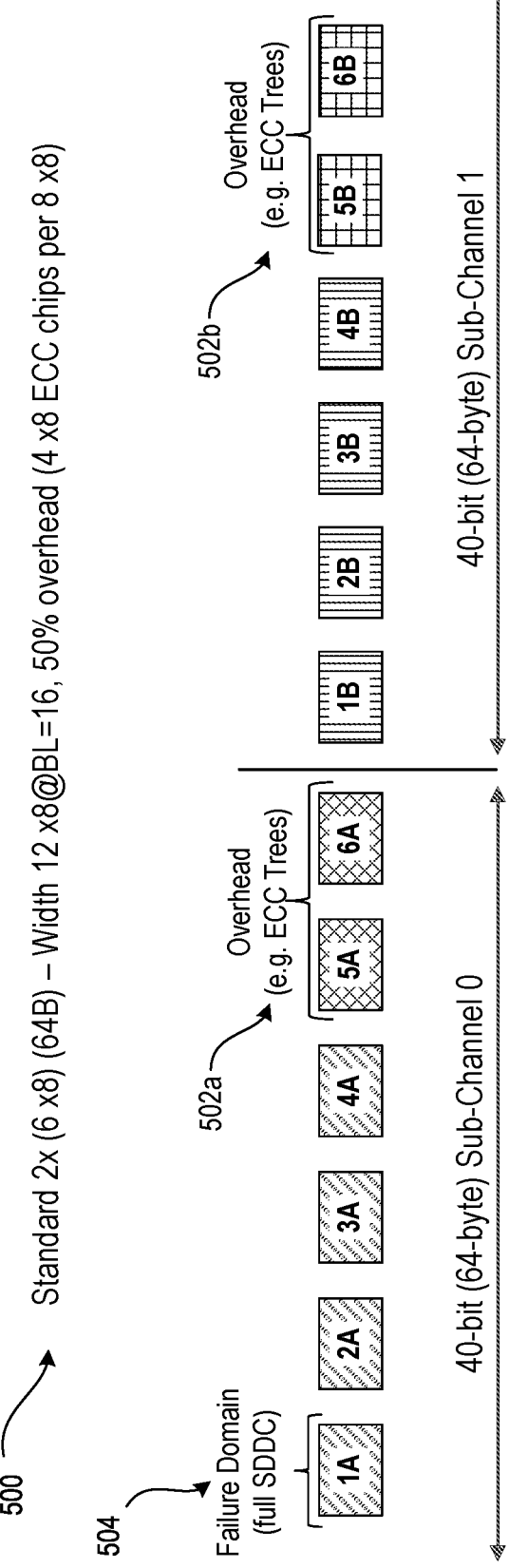
FIG. 5A is a block diagram of an example x8 DRAM memory module without reduced ECC memory overhead.

FIGS. 5A-5D are block diagrams of an example x8 DRAM memory module. FIG. 5A depicts a conventional memory module 500 without reduced ECC memory overhead. Memory module 500 is a standard width 6 x8 (64B) memory module comprising six (6) x8 chips in 40-bit (64B) Sub-Channel 0 and six (6) x8 chips in 40-bit (64B) Sub-Channel 1. A total of four (4) x8 ECC chips 502a/502b across both sub-channels are dedicated to ECC memory overhead, e.g., the ECC trees, and eight (8) x8 chips for data. The illustrated memory module 500 is full SDDC compliant with a failure domain 504 of one x8 chip. Such a conventional arrangement of x8 chips in memory module 500 results in an ECC memory overhead of 50% (4 x8 ECC chips per 8 x8 chips for data).

Figure 5B:
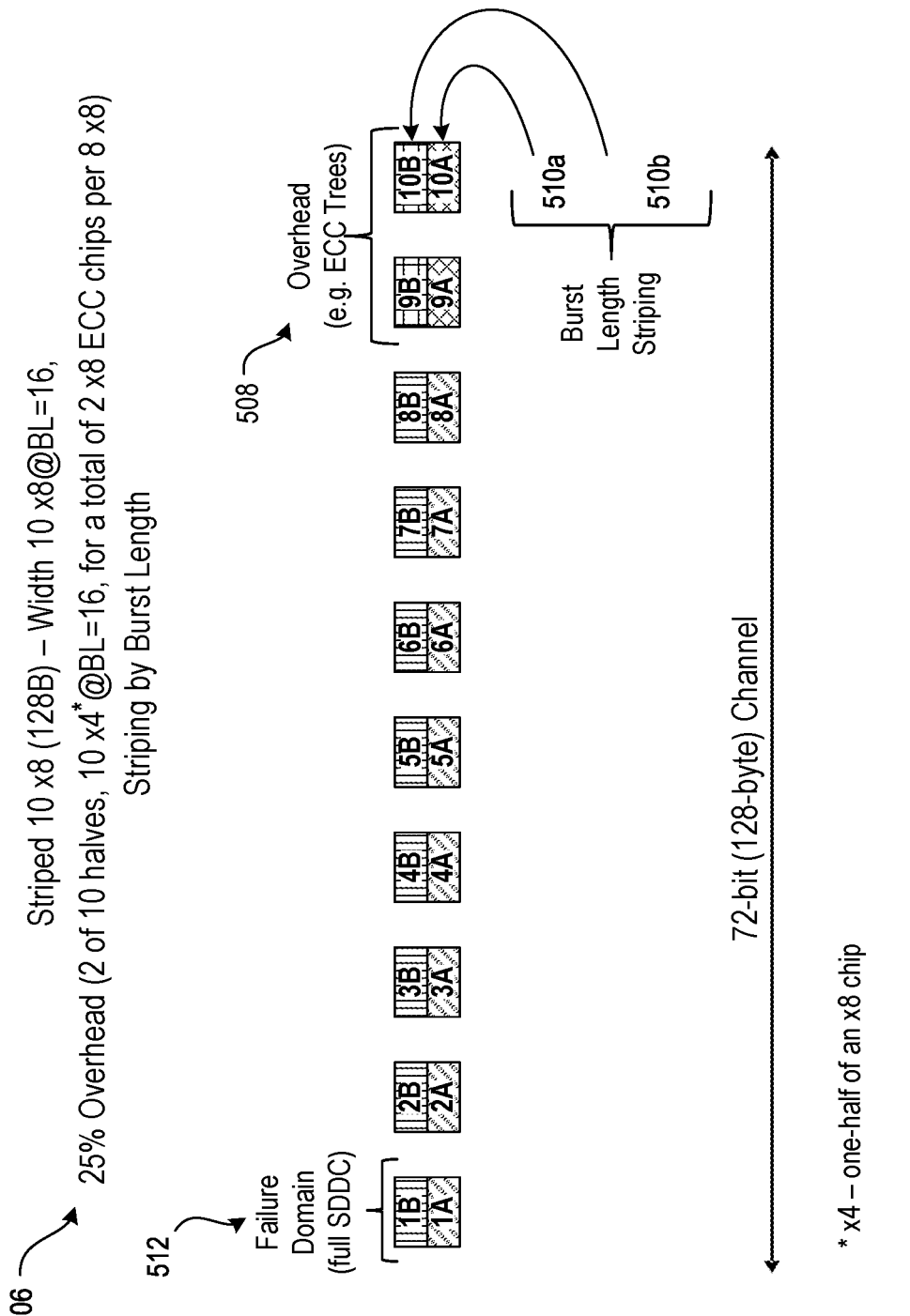
FIG. 5B is a block diagram of an example x8 DRAM memory module with reduced ECC memory overhead in accordance with the described embodiments of a translation cache and configurable ECC.

FIG. 5B depicts a memory module 506 configured in accordance with embodiments of a translation cache and configurable ECC memory as described herein. As illustrated, memory module 506 having a width 10 x8, comprises ten (10) x8 chips in a single 72-bit (128B) channel. Just two of the x8 chips 508 are dedicated to ECC memory overhead, e.g., the ECC trees. By striping the two 64B cache sub-lines that comprise the full 128B cache line across 10 halves for a total of 10 x4 chips at a burst length=16 (where x4 chips refers to one-half stripe of an x8 chip), the ECC memory overhead is reduced to 25% (two x8 ECC chips per 8 x8 chips).

For example, the first half of the burst length 510a results in a first cache sub-line that can be stored in the lower half of the x8 chips, with the ECC trees for the first cache sub-line stored in the lower half of the two x8 chips dedicated to ECC memory 508, where the lower half is illustrated as 1A, 2A, . . . 9A in FIG. 5B. The second half of the burst length 510b results in a second cache sub-line that can be stored in the upper half of the x8 chips, with the ECC trees for the second cache sub-line stored in the upper half of the two x8 chips dedicated to ECC memory 508, where the upper half is illustrated as 1B, 2B, . . . 9B in FIG. 5B.

In one embodiment, the illustrated memory module 504 configured in accordance with a translation cache and configurable ECC memory remains full SDDC compliant with a failure domain 512 of one x8 chip, with a lower half corresponding to the first cache sub-line and the upper half corresponding to the second cache sub-line.

Figure 5C:
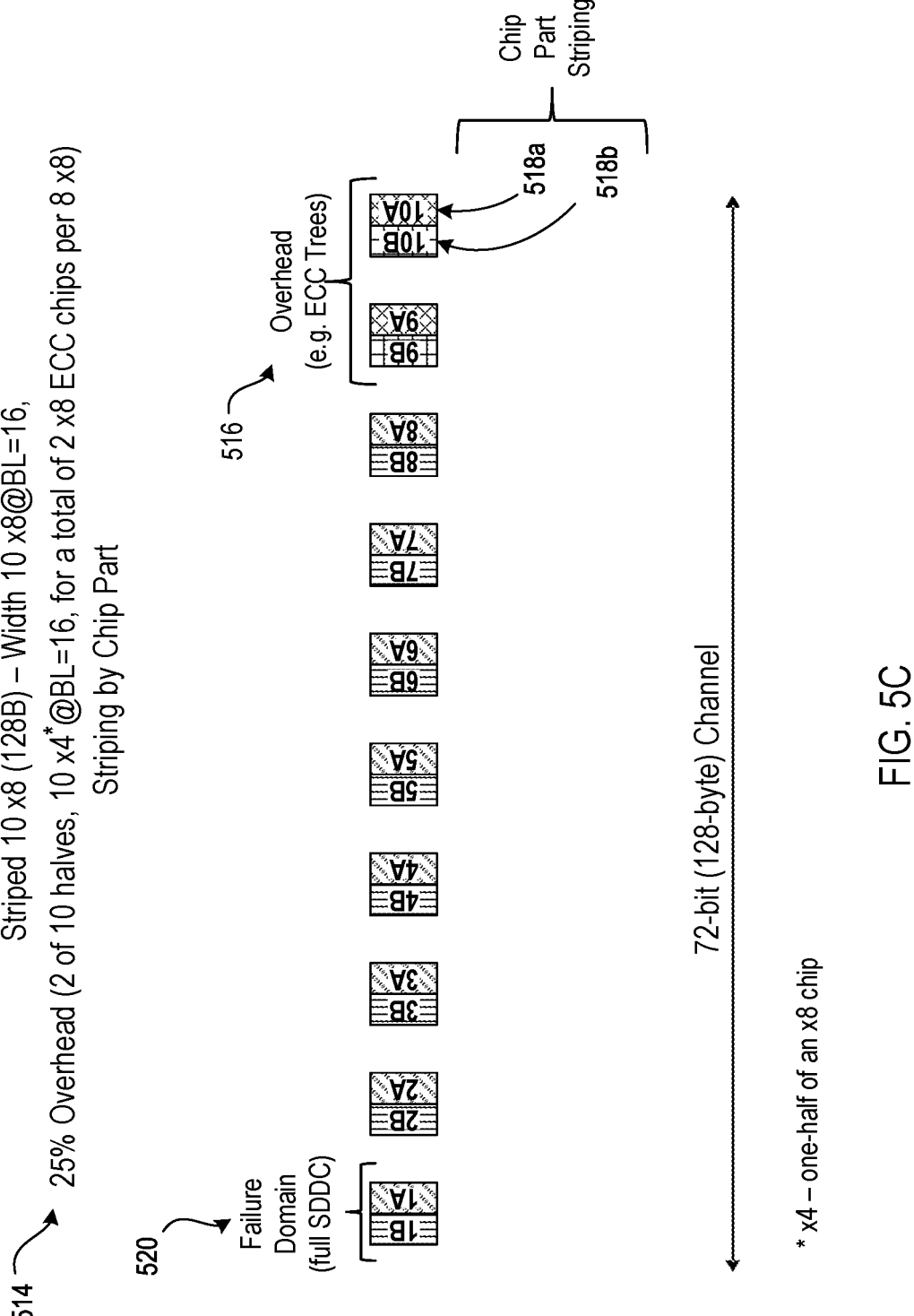
FIG. 5C is a block diagram of another example x8 DRAM memory module with reduced ECC memory overhead in accordance with the described embodiments of a translation cache and configurable ECC.

FIG. 5C depicts a memory module 514 configured in accordance with embodiments of a translation cache and configurable ECC memory as described herein and similar to the memory module 506 depicted in FIG. 5B. Rather than using a striped ECC storage scheme based on burst length, as with memory module 506, the memory module 514 depicted in FIG. 5C uses a striped ECC storage scheme based on a part of the chip, in this case based on which half of the chip is being written, referred to as striping by chip part.

As illustrated, memory module 514 having a width 10 x8, comprises ten (10) x8 chips in a single 72-bit (128B) channel. Just two of the x8 chips 508 are dedicated to ECC memory overhead, e.g., the ECC trees. By striping the two 64B cache sub-lines that comprise the full 128B cache line across 10 halves for a total of 10 x4 chips (where x4 chips refers to one-half stripe of an x8 chip), the ECC memory overhead is again reduced to 25% (two x8 ECC chips per 8 x8 chips).

For example, the first half of the burst length 510a results in a first cache sub-line that can be stored in a right half of each of the x8 chips, with the ECC trees for the first cache sub-line stored in the right halves of the two x8 chips dedicated to ECC memory 516, and where all of the right halves are illustrated as 1A, 2A, . . . 9A in FIG. 5B. The second half of the burst length 510b results in a second cache sub-line that can be stored in the left half of each of the x8 chips, with the ECC trees for the second cache sub-line stored in the left halves of the two x8 chips dedicated to ECC memory 508, and where all of the left halves are illustrated as 1B, 2B, . . . 9B in FIG. 5B.

In one embodiment, the illustrated memory module 514 configured in accordance with a translation cache and configurable ECC memory remains full SDDC compliant with a failure domain 520 of one x8 chip, with a right half corresponding to the first cache sub-line and the left half corresponding to the second cache sub-line.

Figure 5D:
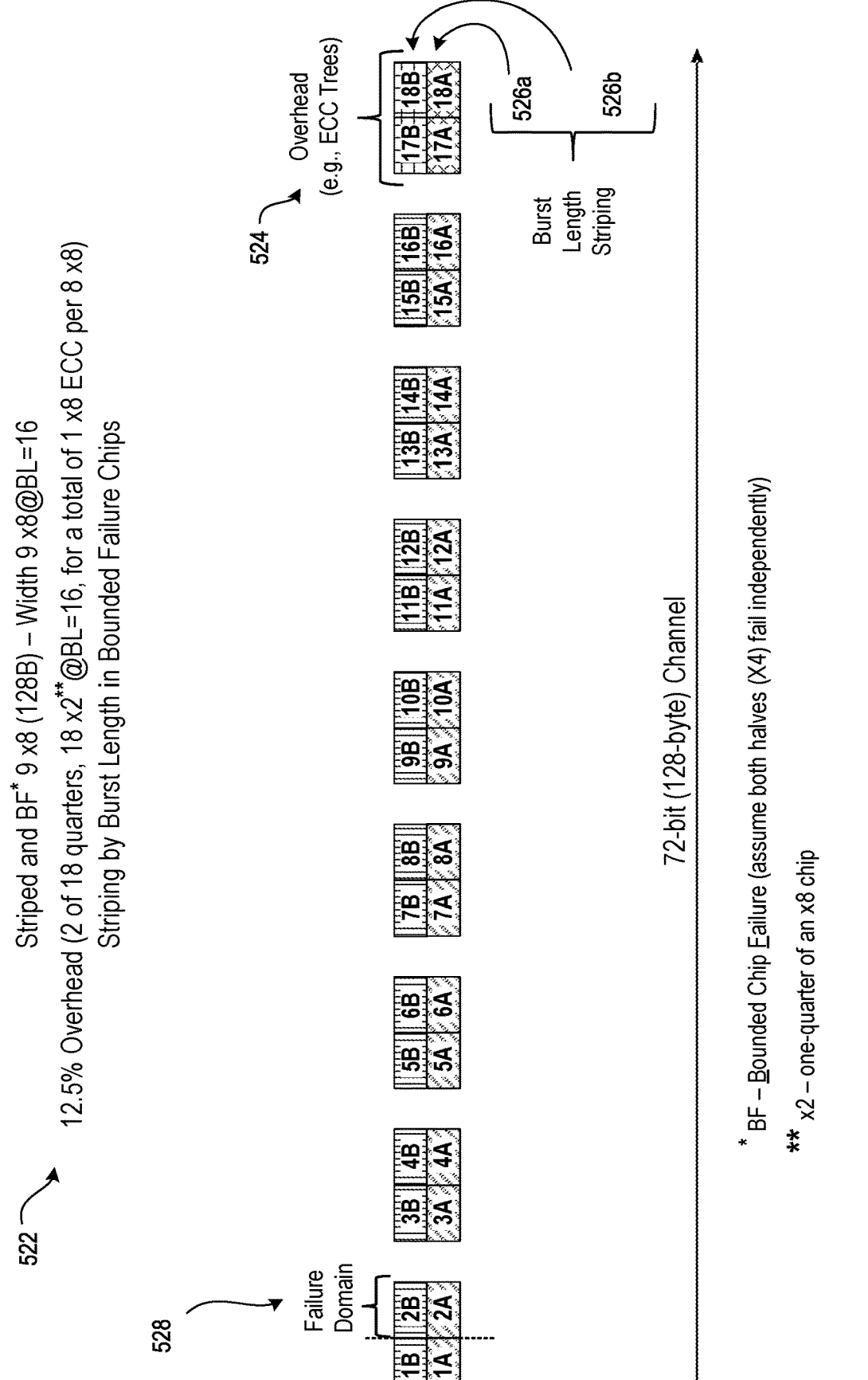
FIG. 5D is a block diagram of another example x8 DRAM memory module with reduced ECC memory overhead in accordance with the described embodiments of a translation cache and configurable ECC.

FIG. 5D depicts a memory module 522 configured in accordance with embodiments of a translation cache and configurable ECC memory as described herein. As illustrated, memory module 522 comprises x8 chips capable of bounded failure ("BF") in which both halves (x4) of an x8 chip operate as independent failure domains. The memory module 522, having width 9 x8, comprises nine (9) x8 chips (128B) in a single 72-bit (128B) channel. Just one of the x8 chips 524 is dedicated to ECC memory overhead, e.g., the ECC trees. By striping the two 64B cache sub-lines across 9 x8 BF chips that comprise the full 128B cache line, the ECC memory overhead is only 12.5% (2 of 18 quarters for a total of 18 x2 chips at a burst length=16, where x2 chips refers to one-quarter of striped x8 chip, resulting in 1 x8 ECC chip per 8 x8 chips for data).

For example, the first half of the burst length 526a results in a first cache sub-line that can be stored in one of the lower quarters of each of the x8 chips, with the ECC trees for the first cache sub-line stored in a corresponding one of the lower quarters of the one x8 chip dedicated to ECC memory 524, where the lower quarters are illustrated as 1A, 2A, . . . 18A in FIG. 5D. The second half of the burst length 510b results in a second cache sub-line that can be stored in the upper quarters of each of the x8 chips, with the ECC trees for the second cache sub-line stored in a corresponding one of the upper quarters of the one x8 chip dedicated to ECC memory 516, where the upper quarters are illustrated as 1B, 2B, . . . 18B in FIG. 5D.

In one embodiment, the illustrated memory module 522 configured in accordance with a translation cache and configurable ECC memory remains full SDDC compliant with a failure domain 528 for each half of one x8 chip, with the quarters in the lower half of the failure domain corresponding to the first cache sub-line and the quarters in the upper half of the failure domain corresponding to the second cache sub-line.

As a result of implementing a striped ECC storage scheme in accordance with embodiments of a translation cache and configurable ECC memory, whether a burst length striping or a chip half striping (or other chip part pattern), two 64B ECC trees can be stored in the same DRAM overhead as a single 128B ECC tree. It should be noted that, although the embodiments of memory modules 406, 506, 514 and 522 are described with reference to a DDR5 chip having a burst length of 16 data words and cache sub-lines that can be defined by the first or second half of the burst length, a similar arrangement and reduction in ECC memory overhead can be implemented with other types of chips and/or when the cache sub-lines are determined in other ways (e.g., where there are more than two segments to be stored on memory chips using an ECC striping or other patterned storage scheme in accordance with the described embodiments). In addition, although not illustrated, the striped ECC storage scheme described in FIG. 5C based on a determination of which part of a chip is to be written, e.g., which half of the chip, can also be employed in a memory module comprising x4 chips, such as the memory module 406 described in FIG. 4B and in a memory module that supports bounded chip failure (BF), such as the memory module 528 described in FIG. 5D.

Figure 6:
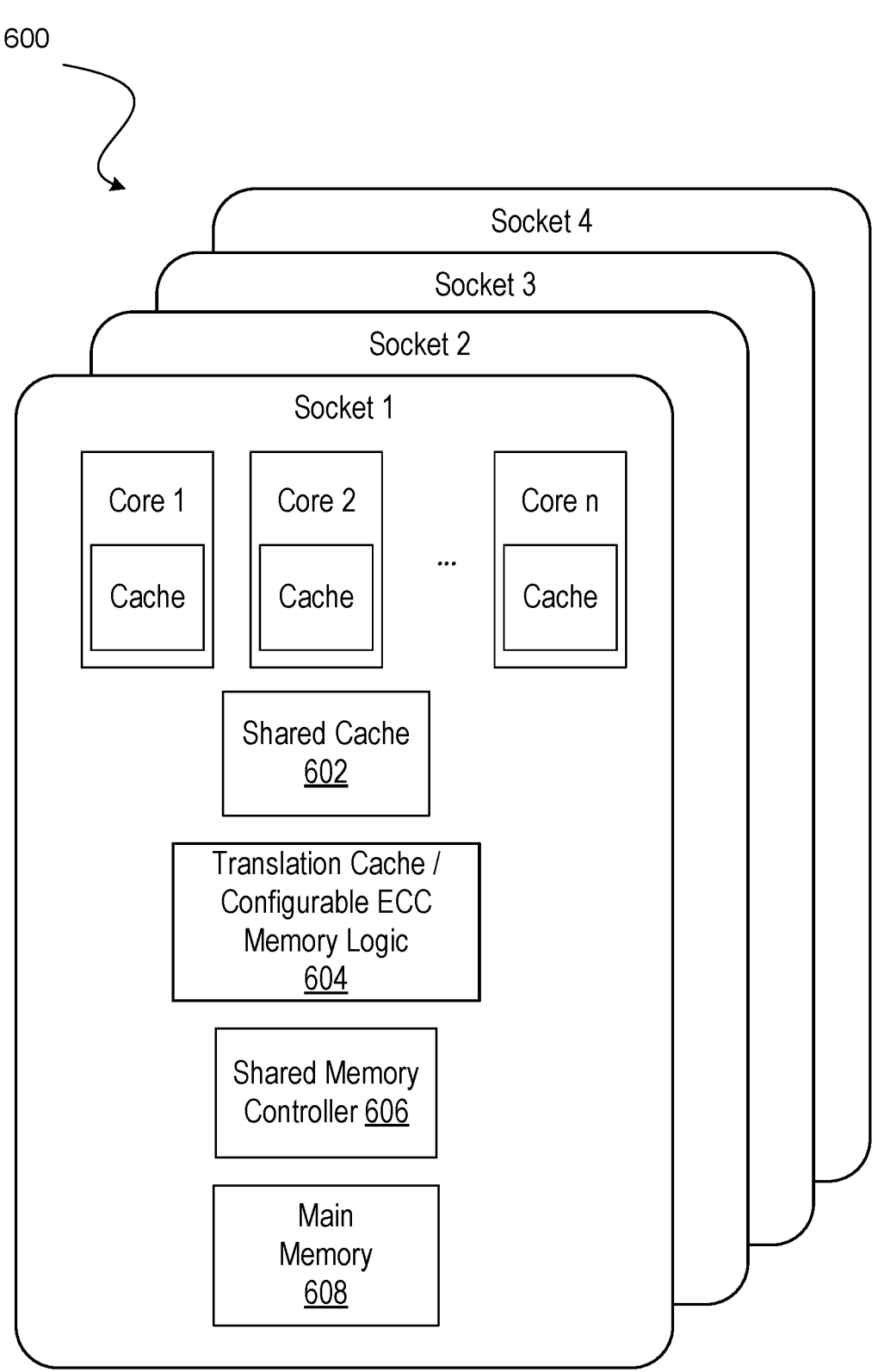
FIG. 6 is a block diagram of an example multi-processor computer architecture in which a translation cache and configurable ECC memory to reduce ECC memory over-head can be implemented in accordance with the described embodiments.
Figure 7:
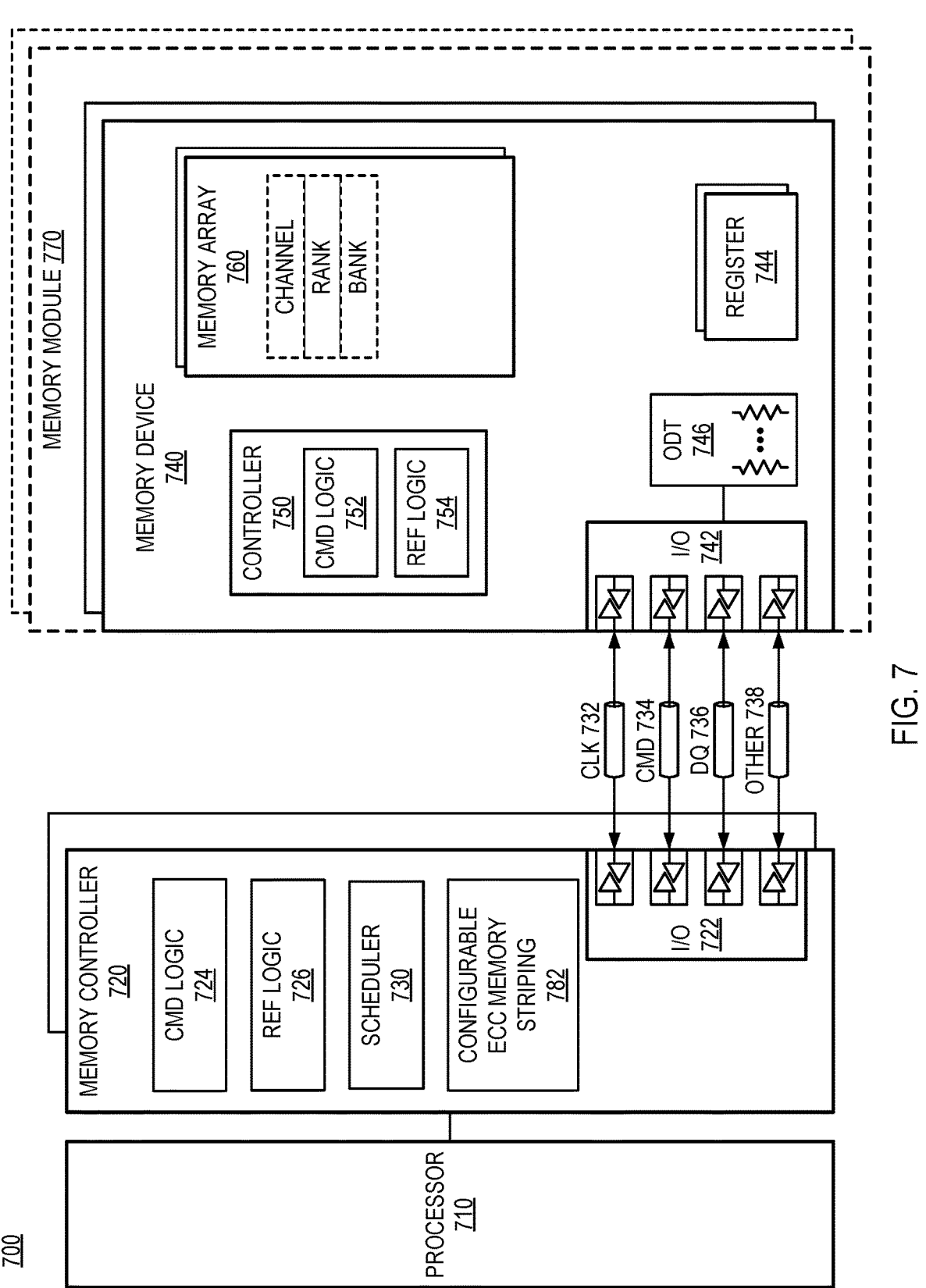
FIG. 7 is a block diagram of an example of a memory subsystem in which a translation cache and configurable ECC memory to reduce ECC memory overhead can be implemented in accordance with the described embodi-ments.

FIG. 6 and FIG. 7, each illustrate aspects of example systems in which embodiments of a translation cache and configurable ECC memory can be implemented in accordance with various examples described herein.

For example, FIG. 6 illustrates a simplified block diagram of an example multi-processor computer architecture in which embodiments of a translation cache and configurable ECC memory can be implemented in accordance with various examples described herein. By way of example only and not limitation, in some embodiments a multi-processor system 600 includes one or more sockets, such as the illustrated Socket 1, Socket 2, Socket 3 and Socket 4, each coupled to one another and each containing a multi-core processor, Core 1, Core 2, . . . Core n. In one embodiment each core is coupled to a local cache and each socket is coupled to a shared cache 602.

In one embodiment, system 600 employs a shared memory architecture that allows memory to be shared between independent nodes for exclusive or shared access using load/store or read/write memory semantics, where an independent node includes a core of a multi-core processor, such as Core 1, Core 2, . . . Core n. For example, in the illustrated multi-processor system 600, each socket is coupled to a shared memory controller 606 and a main memory 608, where the memory controller 606 controls the operations performed on main memory 608, shared cache 602 and local caches of Core 1, Core 2, . . . Core n in accordance with a translation cache and configurable ECC memory logic 604 as described herein.

A multi-processor system 600 can include multiple nodes. Additionally, some example systems can include multiple shared memory controllers 606. In some cases, a node may be able to access shared memory off a remote shared memory controller to which it is not directly attached to (i.e., the node's local shared memory controller connects to the remote shared memory controller through one or multiple shared memory links). The remote shared memory controller may be in the same board or could be in a different board. In some cases, some of the nodes may be off-system (e.g., off board or off chip) but nonetheless access shared cache 602.

For instance, a shared memory controller 606 can be provided that accepts load/store or read/write access requests of the various nodes/cores on the system, including cache requests. Shared cache 602 can be implemented utilizing synchronous dynamic random access memory (SDRAM), dual in-line memory modules (DIMM), and other non-volatile memory (or volatile memory). Each node may itself have one or multiple CPU sockets and may also include local memory/cache that remains insulated from access by other nodes in the system. The node can communicate with other devices on the system (e.g., shared memory controller 606 and other nodes/cores, etc.) using one or more protocols, including Peripheral Component Interconnect Express (PCIe), Quick Path Interconnect (QPI), Ethernet, among other examples. In some implementations, a shared memory link (SML) protocol can be provided through which low latency memory semantics can be supported. SML can be used, for instance, in communicating reads and writes of shared cache 602 (through shared memory controller 606) by the various nodes/cores of a multi-processor system 600.

As noted, in some implementations, a shared memory controller 606 can be provided that includes logic for handling load/store requests of nodes Core 1, Core 2, . . . Core n in a multi-processor system 600. Load/store requests can be received by the share memory controller 606 over links utilizing a shared memory link and connecting the nodes Core 1, Core 2 . . . Core n to the shared memory controller 606. In some implementations the shared memory controller 606 can be implemented as a device, such as an application-specific integrated circuit (ASIC), including logic for servicing the access requests of the nodes Core 1, Core 2, . . . Core n for shared memory resources. In other instances, the shared memory controller 606 as well as shared cache 602 can reside on a device, chip, or board separate from one or more (or even all) of the nodes Core 1, Core 2, . . . Core n. The shared memory controller 606 can further include logic to coordinate various nodes' transactions that involve shared cache 602.

Additionally, the shared memory controller 606 can maintain a global cache directory (not shown) tracking access to various data resources, such as each cache line, included in shared cache 602. For instance, a data resource can be in a shared access state (e.g., capable of being accessed (e.g., loaded or read) by multiple processing and/or I/O devices within a node, simultaneously, an exclusive access state (e.g., reserved exclusively, if not temporarily, by a single processing and/or I/O device within a node (e.g., for a store or write operation), an uncached state, among other potential examples.

Further, while each node may have direct access to one or more portions of shared cache 602, different addressing schemes and values may be employed by the various nodes Core 1, Core 2, . . . Core n resulting in the same shared memory data being referred to (e.g., in an instruction) by a first node according to a first address value and a second node being referring to the same data by a second address value. The shared memory controller 606 can include logic, including data structures mapping nodes' addresses to shared memory resources, to allow the shared memory controller 606 to interpret the various access requests of the various nodes Core 1, Core 2, Core n.

Additionally, in some cases, some portion of shared memory (e.g., certain partitions, memory blocks, records, files, etc.) may be subject to certain permissions, rules, and assignments such that only a portion of the nodes Core 1, Core 2, . . . Core n are allowed (e.g., by the shared memory controller 606) to access the corresponding data. Indeed, each shared memory resource may be assigned to a respective (and in some cases different) subset of the nodes Core 1, Core 2, . . . Core n of the system. These assignments can be dynamic and shared memory controller 606 can modify such rules and permissions (e.g., on-demand, dynamically, etc.) to accommodate new or changed rules, permissions, node assignments and ownership applicable to a given portion of the shared cache 602.

FIG. 7 is a block diagram of an example of a system in which a translation cache and configurable ECC memory can be implemented. System 700 includes a processor 710 and elements of a memory subsystem in a computing device, including one or more memory controller(s) 720 and memory device(s) 740 contained in memory modules 770. System 700 is one example of systems 100 and 200, including memory subsystem 120, as respectively represented in FIG. 1 and FIG. 2. The computing device can include, but is not limited to, a server, a workstation computer, a desktop computer, a laptop computer, a tablet computer and/or a mobile device.

In one example, memory device 740 includes configurable ECC memory striping (or other storage pattern) circuitry and/or logic 782 to enable a translation cache to operate between a processor complex having a different cache line size than the memory, such as a processor 710 with a 64-byte cache line size and a memory device 740 with a 128-byte line size, referred to as operating in a 128-byte mode. This allows the translation cache, such as the memory-side oriented cache 116 illustrate in FIG. 1, or a modified last level cache, such as the 64B L3 cache 112, to configure the ECC memory in memory device 740 to reduce ECC memory overhead in accordance with the described embodiments. For example, the striping logic 782 can include circuitry and/or logic for accessing the memory device 740 using the striping or other patterned storage scheme to reduce ECC memory overhead in accordance with the described embodiments. Alternatively, the processor complex is to perform standard writes and reads when indicated, i.e., when the memory does not contain configurable ECC memory and/or the processor and the memory both use a 64-byte cache line size, referred to as a pure 64-byte mode.

Processor 710 represents a processing unit of a computing platform that may execute an operating system (OS) and applications, which can collectively be referred to as the host or the user of the memory. An OS can be implemented in software that manages computer hardware and other software including memory allocation and access to I/O devices. Examples of operating systems include Microsoft® Windows®, Linux®, iOS® and Android®.

The OS and applications execute operations that result in memory accesses. Processor 710 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. A GPU can include one or more GPU cores and a GPU cache which can store graphics related data for the GPU core. The GPU core can internally include one or more execution units and one or more instruction and data caches. Additionally, the GPU can contain other graphics logic units such as one or more vertex processing units, rasterization units, media processing units, and codecs.

Memory accesses may also be initiated by devices such as a network controller or hard disk controller. Such devices can be integrated with the processor in some systems or attached to the processer via a bus (e.g., PCIe), or a combination. System 700 can be implemented as an SoC (system on a chip), or be implemented with standalone components. which combines processor, graphics, memory, and Input/Output (I/O) control logic into one SoC package.

Reference to memory device(s) 740 can apply to different memory types. For example, memory device(s) 740 can include volatile memory and nonvolatile memory. Volatile memory is memory whose state (and therefore the data stored on it) is indeterminate if power is interrupted to the memory device. Dynamic volatile memory requires refreshing the data stored in the memory device to maintain state. One example of dynamic volatile memory includes DRAM (dynamic random access memory), or some variant such as synchronous DRAM (SDRAM).

In contrast to volatile memory, nonvolatile memory is memory whose state is determinate even if power is interrupted to the memory device. In one example, the nonvolatile memory device is a block addressable memory device, such as a device that can use NAND (not AND) or NOR (not OR) technologies, multi-threshold level NAND flash memory, including single or multi-level Phase Change Memory (PCM), (for example, Single-Level Cell ("SLC"), Multi-Level Cell ("MLC"), Quad-Level Cell ("QLC"), Tri-Level Cell ("TLC"), and Penta-Level Cell ("PLC") or some other NAND).

In one embodiment, the memory device may be or may include memory devices that use chalcogenide glass, a resistive memory, nanowire memory, ferroelectric random-access memory (FeRAM), ferroelectric transistor random access memory (FeTRAM), anti-ferroelectric memory, nanowire-based non-volatile memory, memory that incorporates memristor technology, magnetoresistive random access memory (MRAM) memory that incorporates memristor technology, resistive memory including the metal oxide base, the oxygen vacancy base and the conductive bridge Random Access Memory (CB-RAM), spin-transfer torque memory (STT-RAM) or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

A memory subsystem as described herein may be compatible with a number of memory technologies, such as DDR4 (double data rate (DDR) version 4, JESD79-4, originally published in September 2012 by JEDEC, LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (LPDDR version 5, JESD209-5, originally published by JEDEC in February 2019), HBM2 ((HBM version 2), currently in discussion by JEDEC), or others, or combinations of memory technologies and technologies based on derivatives or extensions of such specifications.

Memory controller 720 represents one or more memory controller circuits or devices for system 700. Memory controller 720 represents control logic that generates memory access commands in response to the execution of operations by processor 710. Memory controller 720 accesses one or more memory devices 740. Memory devices 740 can be DRAM devices in accordance with any referred to above. In one example, memory devices 740 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 720 manages a separate memory channel, although system 700 can be configured to have multiple channels managed by a single controller, or to have multiple controllers on a single channel. In one example, memory controller 720 is part of host processor 710, such as logic implemented on the same die or implemented in the same package space as the processor.

Memory controller 720 includes I/O interface logic 722 to couple to a memory bus, such as a memory channel as referred to above. I/O interface logic 722 (as well as I/O interface logic 742 of memory device 740) can include pins, pads, connectors, signal lines, traces, or wires, or other hardware to connect the devices, or a combination of these. I/O interface logic 722 can include a hardware interface. As illustrated, I/O interface logic 722 includes at least drivers/transceivers for signal lines. Commonly, wires within an integrated circuit interface couple with a pad, pin, or connector to interface signal lines or traces or other wires between devices. I/O interface logic 722 can include drivers, receivers, transceivers, or termination, or other circuitry or combinations of circuitry to exchange signals on the signal lines between the devices. The exchange of signals includes at least one of transmit or receive. While shown as coupling I/O 722 from memory controller 720 to I/O 742 of memory device 740, it will be understood that in an implementation of system 700 where groups of memory devices 740 are accessed in parallel, multiple memory devices can include I/O interfaces to the same interface of memory controller 720. In an implementation of system 700 including one or more memory modules 770, I/O 742 can include interface hardware of the memory module in addition to interface hardware on the memory device itself. Other memory controllers 720 will include separate interfaces to other memory devices 740. For example, I/O 742 can also communicate with a solid-state drive ("SSD") which includes an SSD controller, a host interface, a volatile memory and a non-volatile memory device that includes one or more non-volatile memory arrays and controllers.

The bus between memory controller 720 and memory devices 740 can be implemented as multiple signal lines coupling memory controller 720 to memory devices 740. The bus may typically include at least clock (CLK) 732, command/address (CMD) 734, and write data (DQ) and read data (DQ) 736, and zero or more other signal lines 738. In one example, a bus or connection between memory controller 720 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 700 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 720 and memory devices 740. An example of a serial bus technology is 8B10B encoding and transmission of high-speed data with embedded clock over a single differential pair of signals in each direction. In one example, CMD 734 represents signal lines shared in parallel with multiple memory devices. In one example, multiple memory devices share encoding command signal lines of CMD 734, and each has a separate chip select (CS_n) signal line to select individual memory devices.

It will be understood that in the example of system 700, the bus between memory controller 720 and memory devices 740 includes a subsidiary command bus CMD 734 and a subsidiary bus to carry the write and read data, DQ 736. In one example, the data bus can include bidirectional lines for read data and for write/command data. In another example, the subsidiary bus DQ 736 can include unidirectional write signal lines for write and data from the host to memory, and can include unidirectional lines for read data from the memory to the host. In accordance with the chosen memory technology and system design, other signals 738 may accompany a bus or sub bus, such as strobe lines DQS. Based on design of system 700, or implementation if a design supports multiple implementations, the data bus can have more or less bandwidth per memory device 740. For example, the data bus can support memory devices that have either a x4 interface, a x8 interface, a x16 interface, or other interface. The convention "xW," where W is an integer that refers to an interface size or width of the interface of memory device 740, which represents a number of signal lines to exchange data with memory controller 720. The interface size of the memory devices is a controlling factor on how many memory devices can be used concurrently per channel in system 700 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 740 and memory controller 720 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 740 can transfer data on each UI. Thus, a x8 memory device operating on BL8 can transfer 84 bits of data (8 data signal lines times 8 data bits transferred per line over the burst). It will be understood that this simple example is merely an illustration and is not limiting.

Memory devices 740 represent memory resources for system 700. In one example, each memory device 740 is a separate memory die. In one example, each memory device 740 can interface with multiple (e.g., 2) channels per device or die. Each memory device 740 includes I/O interface logic 742, which has a bandwidth determined by the implementation of the device (e.g., x16 or x8 or some other interface bandwidth). I/O interface logic 742 enables the memory devices to interface with memory controller 720. I/O interface logic 742 can include a hardware interface, and can be in accordance with I/O 722 of memory controller, but at the memory device end. In one example, multiple memory devices 740 are connected in parallel to the same command and data buses. In another example, multiple memory devices 740 are connected in parallel to the same command bus, and are connected to different data buses. For example, system 700 can be configured with multiple memory devices 740 coupled in parallel, with each memory device responding to a command, and accessing memory resources 760 internal to each. For a Write operation, an individual memory device 740 can write a portion of the overall data word, and for a Read operation, an individual memory device 740 can fetch a portion of the overall data word. The remaining bits of the word will be provided or received by other memory devices in parallel.

In one example, memory devices 740 are disposed directly on a motherboard or host system platform (e.g., a PCB (printed circuit board) on which processor 710 is disposed) of a computing device. In one example, memory devices 740 can be organized into memory modules 770. In one example, memory modules 770 represent dual inline memory modules (DIMMs). In one example, memory modules 770 represent other organization of multiple memory devices to share at least a portion of access or control circuitry, which can be a separate circuit, a separate device, or a separate board from the host system platform. Memory modules 770 can include multiple memory devices 740, and the memory modules can include support for multiple separate channels to the included memory devices disposed on them. In another example, memory devices 740 may be incorporated into the same package as memory controller 720, such as by techniques such as multi-chip-module (MCM), package-on-package, through-silicon via (TSV), or other techniques or combinations. Similarly, in one example, multiple memory devices 740 may be incorporated into memory modules 770, which themselves may be incorporated into the same package as memory controller 720. It will be appreciated that for these and other implementations, memory controller 720 may be part of host processor 710.

Memory devices 740 each include one or more memory arrays 760. Memory array 760 represents addressable memory locations or storage locations for data. Typically, memory array 760 is managed as rows of data, accessed via wordline (rows) and bitline (individual bits within a row) control. Memory array 760 can be organized as separate channels, ranks, and banks of memory. Channels may refer to independent control paths to storage locations within memory devices 740. Ranks may refer to common locations across multiple memory devices (e.g., same row addresses within different devices) in parallel. Banks may refer to sub-arrays of memory locations within a memory device 740. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 740 include one or more registers 744. Register 744 represents one or more storage devices or storage locations that provide configuration or settings for the operation of the memory device. In one example, register 744 can provide a storage location for memory device 740 to store data for access by memory controller 720 as part of a control or management operation. In one example, register 744 includes one or more mode registers. In one example, register 744 includes one or more multipurpose registers. The configuration of locations within register 744 can configure memory device 740 to operate in different "modes," where command information can trigger different operations within memory device 740 based on the mode. Additionally or in the alternative, different modes can also trigger different operation from address information or other signal lines depending on the mode. Settings of register 744 can indicate configuration for I/O settings (e.g., timing, termination or ODT (on-die termination) 746, driver configuration, or other I/O settings). In one embodiment, a setting of register 744 can indicate whether the memory includes configurable ECC memory that can be configured using a translation cache in accordance with the described embodiments.

In one example, memory device 740 includes ODT 746 as part of the interface hardware associated with I/O 742. ODT 746 can be configured as mentioned above, and provide settings for impedance to be applied to the interface to specified signal lines. In one example, ODT 746 is applied to DQ signal lines. In one example, ODT 746 is applied to command signal lines. In one example, ODT 746 is applied to address signal lines. In one example, ODT 746 can be applied to any combination of the preceding. The ODT settings can be changed based on whether a memory device is a selected target of an access operation or a non-target device. ODT 746 settings can affect the timing and reflections of signaling on the terminated lines. Careful control over ODT 746 can enable higher-speed operation with improved matching of applied impedance and loading. ODT 746 can be applied to specific signal lines of I/O interface 742, 722 (for example, ODT for DQ lines or ODT for CA lines), and is not necessarily applied to all signal lines.

Memory device 740 includes controller 750, which represents control logic within the memory device to control internal operations within the memory device. For example, controller 750 decodes commands sent by memory controller 720 and generates internal operations to execute or satisfy the commands. Controller 750 can be referred to as an internal controller, and is separate from memory controller 720 of the host. Controller 750 can determine what mode is selected based on register 744, and configure the internal execution of operations for access to memory resources 760 or other operations based on the selected mode. Controller 750 generates control signals to control the routing of bits within memory device 740 to provide a proper interface for the selected mode and direct a command to the proper memory locations or addresses. Controller 750 includes command logic 752, which can decode command encoding received on command and address signal lines. Thus, command logic 752 can be or include a command decoder. With command logic 752, memory device can identify commands and generate internal operations to execute requested commands.

Referring again to memory controller 720, memory controller 720 includes command (CMD) logic 724, which represents logic or circuitry to generate commands to send to memory devices 740. The generation of the commands can refer to the command prior to scheduling, or the preparation of queued commands ready to be sent. Generally, the signaling in memory subsystem s includes address information within or accompanying the command to indicate or select one or more memory locations where the memory devices should execute the command. In response to scheduling of transactions for memory device 740, memory controller 720 can issue commands via I/O 722 to cause memory device 740 to execute the commands. In one example, controller 750 of memory device 740 receives and decodes command and address information received via I/O 742 from memory controller 720. Based on the received command and address information, controller 750 can control the timing of operations of the logic and circuitry within memory device 740 to execute the commands. Controller 750 is responsible for compliance with standards or specifications within memory device 740, such as timing and signaling requirements. Memory controller 720 can implement compliance with standards or specifications by access scheduling and control.

Memory controller 720 includes scheduler 730, which represents logic or circuitry to generate and order transactions to send to memory device 740. From one perspective, the primary function of memory controller 720 could be said to schedule memory access and other transactions to memory device 740. Such scheduling can include generating the transactions themselves to implement the requests for data by processor 710 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 720 typically includes logic such as scheduler 730 to allow selection and ordering of transactions to improve performance of system 700. Thus, memory controller 720 can select which of the outstanding transactions should be sent to memory device 740 in which order, which is typically achieved with logic much more complex that a simple first-in first-out algorithm. Memory controller 720 manages the transmission of the transactions to memory device 740, and manages the timing associated with the transaction. In one example, transactions have deterministic timing, which can be managed by memory controller 720 and used in determining how to schedule the transactions with scheduler 730.

In one example, memory controller 720 includes refresh (REF) logic 726. Refresh logic 726 can be used for memory resources that are volatile and need to be refreshed to retain a deterministic state. In one example, refresh logic 726 indicates a location for refresh, and a type of refresh to perform. Refresh logic 726 can trigger self-refresh within memory device 740, or execute external refreshes which can be referred to as auto refresh commands) by sending refresh commands, or a combination. In one example, controller 750 within memory device 740 includes refresh logic 754 to apply refresh within memory device 740. In one example, refresh logic 754 generates internal operations to perform refresh in accordance with an external refresh received from memory controller 720. Refresh logic 754 can determine if a refresh is directed to memory device 740, and what memory resources 760 to refresh in response to the command.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, NAND flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Additional example implementations are as follows:

Example 1 is any of a method, system, apparatus or computer-readable medium for a translation cache and configurable ECC memory comprising a processor and a memory subsystem, the translation cache between the processor and the memory subsystem, wherein the processor manages the translation cache, including receiving one or more portions of cached data, including an error checking and correction ("ECC") data to correct each of the one or more portions of the cached data, determining that the one or more portions of the cached data exceed an internal processor cache width, and processing the one or more portions of the cached data to reduce overhead for storing the ECC data in the memory subsystem.

Example 2 is any of the method, system, apparatus or computer-readable medium of Example 1, wherein processing the one or more portions of the cached data to reduce overhead for storing the ECC data in the memory subsystem further includes using any of a burst length or corresponding parts of memory devices to access the cached data to determine which portion of the cached data in the translation cache to process, and holding any one or more remaining portions of the cached data in the translation cache to allow the processor to any of write and read all remaining portions before the translation cache is flushed.

Example 3 is any of the method, system, apparatus or computer-readable medium as in any of Examples 1 and 2, wherein the memory subsystem includes memory devices capable of storing the one or more portions of the cached data, including the ECC data, in corresponding parts of the memory devices to reduce overhead for storing the ECC data in the memory subsystem, the corresponding parts including any same one of an upper, lower, left and right parts of the memory devices, the corresponding parts capable of storing any of the one or more portions of the cached data, including storing the ECC data in a corresponding part of a separate memory device, and wherein processing the one or more portions of the cached data to reduce overhead for storing the ECC data in the memory subsystem includes reading from and writing to the memory devices capable of storing the one or more portions of the cached data in the corresponding parts of the memory devices, including storing the ECC data.

Example 4 is any of the method, system, apparatus or computer-readable medium as in any of Examples 1 through 3, wherein the memory devices include dynamic random access memory ("DRAM") devices, and further wherein any of: the DRAM devices include any of an x4 and an x8 DRAM device operating in accordance with a double data rate ("DDR") standard, including DDR version 5, the DRAM devices are included in a dual inline memory module ("DIMM") compliant with full single device data correction ("SDDC"), the DIMM including a failure domain of one DRAM device in the DRAM devices comprising the DIMM, and the DRAM devices support bounded failure ("BF") in which each part of the DRAM devices, including both halves of the DRAM devices, operate as independent failure domains.

Example 5 is any of the method, system, apparatus or computer-readable medium as in any of Examples 1 through 4, wherein the processor is further to determine a mode of operation of the processor based on the memory subsystem, including to determine any of: a memory cache width of the memory subsystem is larger than an internal cache width of the processor, a state of a register in the memory subsystem controlling the mode of operation of the processor, wherein the mode of operation of the processor controls how the processor manages the translation cache.

Example 6 is any of the method, system, apparatus or computer-readable medium as in any of Examples 1 through 5, wherein the memory cache width is any multiple of the internal cache width of the processor, including a width of 128 bytes, a multiple of the internal cache width of the processor of 64 bytes.

Example 7 is any of the method, system, apparatus or computer-readable medium as in any of Examples 1 through 6, wherein the translation cache is a memory side cache ("MSC") having a full cache width, the full cache width matching the memory cache width of the memory subsystem.

Example 8 is any of the method, system, apparatus or computer-readable medium as in any of Examples 1 through 7, wherein the translation cache is a redefined last level cache of the processor, including a redefined level three (L3) cache, the redefined last level cache having a cache width matching the internal cache width of the processor, and the method, system, apparatus or computer-readable medium further comprising: an interface to the memory subsystem, the interface having a larger cache width than the internal cache width of the processor, a write order buffer coupled to the redefined last level cache and the interface to the memory subsystem, the write order buffer having a width matching the internal cache width of the processor, and a read hold buffer coupled to the redefined last level cache and the interface to the memory subsystem, the read hold buffer having a width matching the internal cache width of the processor.

Example 9 is any of the method, system, apparatus or computer-readable medium as in any of Examples 1 through 8, wherein processing the one or more portions of the cached data to reduce overhead for storing the ECC data in the memory subsystem, further includes reading from the read hold buffer all of a read data read from the memory subsystem via the interface, writing to the write order buffer all of a write data written to the memory subsystem via the interface, and further wherein the processor manages eviction processes in the redefined last level cache, including caching any level two (L2) dirty evicts in the redefined last level cache, pairing evictions in the redefined last level cache, including cleaning determined portions of the cache along with any remaining portion of the cache associated with the determined portion, flushing any unpaired writes from the write order buffer during any one or more free memory cycles of the processor, and holding any unused portion of read data received in the redefined last level cache via the interface to the memory subsystem in the read hold buffer.

Example 10 is any of the method, system, apparatus or computer-readable medium as in any of Examples 1 through 9, wherein the larger cache width of the interface is any multiple of the internal cache width of the processor, including 128 bytes, a multiple of the internal cache width of the processor of 64 bytes.

Example 11 is any of a method, system, apparatus or computer-readable medium for a translation cache and configurable ECC memory comprising memory that includes devices capable of storing data in corresponding parts of the devices, wherein the devices are configurable to reduce overhead for storing an error checking and correction ("ECC") data to correct the data, including to store the ECC data in a corresponding part of a separate device, and wherein the corresponding parts include any same one of an upper, lower, left and right parts of the devices and the separate device.

Example 12 is any of the method, system, apparatus or computer-readable medium of Example 11, further comprising circuitry coupled to a translation cache between the memory and a processor, the processor having an internal processor cache width less than a memory width of the memory, the memory width based on a width of each of the devices comprising the memory, the circuitry to access the corresponding parts of the devices responsive to a request from the processor, and wherein the data accessed in the corresponding parts of the devices comprise a portion of a cache line in the translation cache to match the internal processor cache width.

Example 13 is any of the method, system, apparatus or computer-readable medium of Example 11 through Example 12, the memory further comprising a mode register, wherein the mode register controls a mode of operation of the processor, including causing the processor to determine whether any of: the internal processor cache width is less than the memory width and the devices are configurable to reduce overhead for storing the ECC data, and further wherein the mode of operation causes the processor to perform a standard cache process when the mode register indicates the devices are not capable of storing data, including the ECC data, in the corresponding parts of the devices to reduce overhead for storing the ECC data.

Example 14 is any of the method, system, apparatus or computer-readable medium of Example 11 through Example 13, wherein the memory width is any multiple of the internal processor cache width, including the memory width of 128 bytes of double the internal processor cache width of 64 bytes.

Example 15 is any of the method, system, apparatus or computer-readable medium of Example 11 through Example 14, wherein the translation cache is a memory side cache ("MSC") having a full cache width, the full cache width matching the memory width.

Example 16 is any of the method, system, apparatus or computer-readable medium of Example 11 through Example 15, wherein the translation cache is a redefined last level cache of the processor, including a redefined level three (L3) cache, the redefined last level cache having a cache width matching the internal processor cache width, and further wherein the redefined last level cache is coupled to an interface to the memory, the interface having a larger cache width than the internal processor cache width, and the interface includes: a write order buffer coupled to the redefined last level cache, the write order buffer having a width matching the internal processor cache width, and a read hold buffer coupled to the redefined last level cache, the read hold buffer having a width matching the internal processor cache width.

Example 17 is any of the method, system, apparatus or computer-readable medium of Example 11 through Example 16, wherein the devices include dynamic random access memory ("DRAM") devices, and further wherein any of: the DRAM devices include any of an x4 and an x8 DRAM device operating in accordance with a double data rate ("DDR") standard, including DDR version 5, the DRAM devices are included in a dual inline memory module ("DIMM") compliant with full single device data correction ("SDDC"), the DIMM including a failure domain of one DRAM device in the DRAM devices comprising the DIMM and the DRAM devices support bounded failure ("BF") in which each part of the DRAM devices, including both halves of the DRAM devices, operate as independent failure domains.

Although the foregoing detailed description referenced illustrative embodiments of the claimed subject matter, many alternatives, modifications, and variations thereof will be apparent to those skilled in the art. Accordingly, it is intended that the claimed subject matter be viewed broadly and defined as set forth in the accompanying claims.

What is claimed is:

1. An apparatus comprising:
a circuitry coupled to a memory subsystem having a memory cache line width, the circuitry to:
translate cached data with the memory cache line width into a translation cache of one or more cache sub-lines matching an internal processor cache line width, each cache sub-line including an error checking and correction (ECC) data to error check and correct the cached data in the cache sub-line,
hold any of the one or more cache sub-lines in the translation cache to allow sufficient time to any of write and read all cache sub-lines for the cached data before the translation cache is flushed; and
wherein the cache sub-lines, including the ECC data, are stored in corresponding parts of memory devices of the memory subsystem to reduce memory device overhead to store ECC data.

2. The apparatus of claim 1, the circuitry further to determine the one or more cache sub-lines based on any of:
a burst length, wherein a first half of the burst length corresponds to a first cache sub-line and a second half of the burst length corresponds to a second cache sub-line; and
the corresponding parts of the memory devices in which the cache sub-lines are stored, wherein a first set of parts corresponds to the first cache sub-line and a second set of parts corresponds to the second cache sub-line.

3. The apparatus of claim 1, wherein:
the corresponding parts of the memory devices in which the cache sub-lines are stored include any same one of an upper, lower, right and left parts of the memory devices, including storing the ECC data for a cache sub-line in any of a corresponding part of a separate memory device separate from memory devices in which data for the cache sub-line is stored; and
the circuitry further to read from and write to the corresponding parts of the memory devices in which the cache sub-lines are stored.

4. The apparatus of claim 1, wherein the memory devices include dynamic random access memory (DRAM) devices, and further wherein any of:
the DRAM devices include any of an x4 and an x8 DRAM device operating in accordance with a double data rate (DDR) standard, including DDR version 5;
the DRAM devices are included in a dual inline memory module (DIMM) compliant with full single device data correction (SDDC), the DIMM including a failure domain of one DRAM device in the DRAM devices comprising the DIMM; and
the DRAM devices support bounded failure (BF) in which each part of the DRAM devices operate as independent failure domains.

5. The apparatus of claim 1, the circuitry further to perform a standard cache process when any of the memory cache line width is determined to match the internal processor cache line width and the memory subsystem is determined not capable of storing the cached data to reduce memory device overhead to store the ECC data.

6. The apparatus of claim 1, the circuitry further to determine a mode of operation including to determine any of:
a state of a register in the memory subsystem controlling the mode of operation; and
wherein the mode of operation causes the circuitry to perform a standard cache process when the state of the register indicates the memory subsystem does not include memory devices capable of storing data, including the ECC data, in the corresponding parts of the memory devices to reduce overhead for storing the ECC data.

7. The apparatus of claim 1, wherein the memory cache width is any multiple of the internal processor cache line width, including a width of 128 bytes, a multiple of the processor internal cache line width of 64 bytes.

8. The apparatus of claim 1, wherein the translation cache is a memory side cache (MSC) having a full cache width, the full cache width matching the memory cache width of the memory subsystem.

9. The apparatus of claim 1 wherein the translation cache is a redefined last level cache, including a redefined level three (L3) cache, the redefined last level cache having a cache width matching the processor internal cache line width, the apparatus further comprising:

an interface to the memory subsystem, the interface having a larger cache width than any of the processor internal cache line width and the memory cache width of the memory subsystem;

a write order buffer coupled to the redefined last level cache and the interface to the memory subsystem, the write order buffer having a width matching the processor internal cache line width; and a read hold buffer coupled to the redefined last level cache and the interface to the memory subsystem, the read hold buffer having a width matching the processor internal cache line width.

10. The apparatus of claim 9, wherein the circuitry further to:

cache any level two (L2) dirty evicts in the redefined last level cache;

pair evictions in the redefined last level cache, including cleaning cache sub-lines for the cached data;

flush any unpaired writes from the write order buffer during any one or more free memory cycles; and hold any unused portion of read data received in the redefined last level cache via the interface to the memory subsystem in the read hold buffer.

11. The apparatus of claim 9, wherein the larger cache width of the interface is any multiple of the processor internal cache line width, including 128 bytes equal to a multiple of the processor internal cache line width of 64 bytes.

12. A system comprising:

a processor;

a memory subsystem of memory devices in which to store cached data, including an error checking and correction (ECC) data, the memory subsystem having a memory cache line width;

a translation cache between the processor and the memory subsystem; and the processor to manage the translation cache including to:

use any of a burst length or corresponding parts of the memory devices to access the cached data to determine which portion of the cached data to process in the translation cache, receive one or more portions of the cached data in the translation cache, the cached data including the ECC data to correct each of the one or more portions of the cached data, determine that the one or more portions of the cached data exceed an internal processor cache line width, and process the one or more portions of the cached data to reduce overhead to store the ECC data in the memory subsystem, including to:

translate the one or more portions of the cached data into a translation cache of one or more cache sub-lines matching the internal processor cache line width, each cache sub-line including the ECC data to error check and correct the cached data in the cache sub-line, and hold any of the one or more cache sub-lines in the translation cache to allow sufficient time for the processor to any of write and read all cache sub-lines for the cached data before the translation cache is flushed.

13. The system of claim 12, wherein:

the corresponding parts of the memory devices includes any same one of an upper, lower, left and right parts of the memory devices, the corresponding parts to store any of the one or more portions of the cached data, including to store the ECC data in a corresponding part of a separate memory device; and to process the one or more portions of the cached data, the processor is to read from and write to the memory devices to store the one or more portions of the cached data, including the ECC data, in the corresponding parts of the memory devices.

14. The system of claim 12, wherein the processor is further to determine a mode of operation to control how the processor manages the translation cache, including to determine any of:

the memory cache line width of the memory subsystem is larger than an internal processor cache line width;

the devices are configurable to reduce overhead for storing the ECC data; and a state of a register in the memory subsystem controlling the mode of operation.

15. The system of claim 12, wherein:

the memory cache line width is any multiple of the internal processor cache line width, including a width of 128 bytes, a multiple of the internal processor cache line width of 64 bytes; and the translation cache is a redefined last level cache of the processor, including a redefined level three (L3) cache, the redefined last level cache having a cache width matching the internal processor cache line width, the system further comprising:

an interface to the memory subsystem, the interface having a larger cache width than the internal processor cache line width, a write order buffer coupled to the redefined last level cache and the interface to the memory subsystem, the write order buffer having a width matching the internal processor cache line width, and a read hold buffer coupled to the redefined last level cache and the interface to the memory subsystem, the read hold buffer having a width matching the internal processor cache line width.

16. The system of claim 15, wherein:

to process one or more portions of the cached data to reduce overhead to store the ECC data in the memory subsystem, the processor further to:

read from the read hold buffer all of a read data read from the memory subsystem via the interface, and write to the write order buffer all of a write data written to the memory subsystem via the interface; and further wherein the processor to manage eviction processes in the redefined last level cache, including to:

cache any level two (L2) dirty evicts in the redefined last level cache, pair evictions in the redefined last level cache, including cleaning determined portions of the cache along with any remaining portion of the cache associated with the determined portion, flush any unpaired writes from the write order buffer during any one or more free memory cycles of the processor, and hold any unused portion of read data received in the redefined last level cache via the interface to the memory subsystem in the read hold buffer.

17. A memory comprising:

devices to store data in corresponding parts of the devices;

the devices configurable to reduce overhead to store an error checking and correction (ECC) data to correct the data, including to store the ECC data in a corresponding part of a separate device;

the corresponding parts including any same one of an upper, lower, left and right parts of the devices and the separate device; and circuitry coupled to a translation cache between the devices and a processor having an internal cache line width less than a memory cache line width of the devices, the circuitry to:

access cached data stored in the corresponding parts of the devices responsive to a request from the processor, determine which portion of the cached data to process in the translation cache, receive one or more portions of the cached data in the translation cache, the cached data including the ECC data to correct each of the one or more portions of the cached data, determine that the one or more portions of the cached data exceed the internal processor cache line width, and process the one or more portions of the cached data to reduce overhead for storing the ECC data, including to:

translate the one or more portions of the cached data into a translation cache of one or more cache sub-lines matching the internal processor cache line width, each cache sub-line including the ECC data to error check and correct the cached data in the cache sub-line, and hold any of the one or more cache sub-lines in the translation cache to allow sufficient time for the processor to any of write and read all cache sub-lines for the cached data before the translation cache is flushed.

18. The memory of claim 17, further comprising:

a mode register; and the circuitry to determine any of:

a mode of operation of the processor based on the mode register, the internal processor cache line width is less than the memory cache line width; and the devices are configurable to reduce overhead for storing the ECC data.

19. The memory of claim 17, wherein:

the memory cache line width is any multiple of the internal processor cache line width, including a width of 128 bytes, a multiple of the internal processor cache line width of 64 bytes;

the translation cache is a redefined last level cache of the processor, including a redefined level three (L3) cache, the redefined last level cache having a cache width matching the internal processor cache line width;

the redefined last level cache is coupled to an interface to the memory, the interface having a larger cache width than both of the internal processor cache line width and the memory cache line width; and the interface includes:

a write order buffer coupled to the redefined last level cache, the write order buffer having a width matching the internal processor cache line width, and a read hold buffer coupled to the redefined last level cache, the read hold buffer having a width matching the internal processor cache line width.

20. The memory of claim 17, wherein the devices include dynamic random access memory (DRAM) devices, and further wherein any of:

the DRAM devices include any of an x4 and an x8 DRAM device operating in accordance with a double data rate (DDR) standard, including DDR version 5;

the DRAM devices are included in a dual inline memory module (DIMM) compliant with full single device data correction (SDDC), the DIMM including a failure domain of one DRAM device in the DRAM devices comprising the DIMM; and the DRAM devices support bounded failure (BF) in which each part of the DRAM devices operate as independent failure domains.

* * * * *